United States Patent [19]
Wyman

[11] Patent Number: 5,204,897
[45] Date of Patent: Apr. 20, 1993

[54] MANAGEMENT INTERFACE FOR LICENSE MANAGEMENT SYSTEM

[75] Inventor: Robert M. Wyman, Kirkland, Wash.

[73] Assignee: Digital Equipment Corporation, Maynard, Mass.

[21] Appl. No.: 914,040

[22] Filed: Jul. 14, 1992

Related U.S. Application Data

[63] Continuation of Ser. No. 722,840, Jun. 28, 1991, abandoned.

[51] Int. Cl.$^5$ .............................. H04L 9/00
[52] U.S. Cl. ........................... 380/4; 380/25
[58] Field of Search ............................ 380/4, 123, 25

[56] References Cited

U.S. PATENT DOCUMENTS

| | | | |
|---|---|---|---|
| 4,780,821 | 10/1988 | Crossley | 364/200 |
| 4,791,565 | 12/1988 | Dunham et al. | 364/200 |
| 4,924,378 | 5/1990 | Hershey et al. | 364/200 |
| 4,937,863 | 1/1990 | Robert et al. | 380/4 |
| 5,023,907 | 6/1991 | Johnson et al. | 380/4 |
| 5,109,413 | 4/1992 | Comerford et al. | 380/4 |
| 5,138,712 | 8/1992 | Corbin | 380/4 |

OTHER PUBLICATIONS

Wyman, "Future Directions in Digital Distributed Software License Architecture", Oral presentation, DECUS (Digital Equipment Computer User Society), Marlboro, Mass., May 10, 1990, 18 pages.

Primary Examiner—Salvatore Giangialosi
Attorney, Agent, or Firm—Arnold, White & Durkee

[57] ABSTRACT

A distributed computer system employs a license management system to account for software product usage. A management policy having a variety of alternative styles and contexts is provided. Each licensed product upon start-up makes a call to a license server to check on whether usage is permitted, and the license server checks a database of the licenses, called product use authorizations, that it administers. If the particular use requested is permitted, a grant is returned to the requesting user node. The product use authorization is structured to define a license management policy allowing a variety of license alternatives by values called "style", "context", "duration" and "usage requirements determination method". The license administration may be delegated by the license server to a subsection of the organization, by creating another license management facility duplicating the main facility. The license server must receive a license document (a product use authorization) from an issuer of licenses, where a license document generator is provided. A mechanism is provided for one user node to make a call to use a software product located on another user node; this is referred to as a "calling card", by which a user node obtains permission to make a procedure call to use a program on another node. A management interface allows a license manager at a server to modify the license documents in the database maintained by the server, within the restraints imposed by the license, to make delegations, assignments, etc. The license documents are maintained in a standard format referred to as a license document interchange format so the management system is portable and can be used by all adhering software vendors. A feature of the database management is the use of a filter function.

31 Claims, 18 Drawing Sheets

License (Product Use Authorization)

| Field | # |
|---|---|
| Product Name | 35 |
| Producer | 36 |
| Version Nos. | |
| Release Date | |
| Issuer | 37 |
| Licensee | 38 |
| Start Date | 40 |
| End Date | |
| Units Granted | 41 |
| Units Available | 42 |
| Style | 43 |
| Context | 44 |
| Duration | 45 |
| LURDM | 46 |
| LURT | 47 |
| Delegation Auth. | 48 |
| Calling Auth. | 49 |
| Combination Auth. | 50 |
| Overdraft Auth. | 51 |
| Token: | 52 |
| Signature | 53 |
| Check Sum | 54 |

FIG. 2

License Unit Requirements Table

| Row Selector | Columns | | |
|---|---|---|---|
| Platform ID | A | B | C |
| PC-0 | 10 | 230 | -1 |
| PC-1 | 12 | 230 | -1 |
| VAX 6210 | 158 | 300 | 150 |

FIG. 4

| Style (43) | Context (44) | Duration (45) | LURDM (46) |
|---|---|---|---|
| Allocative | Network | Transaction | Constant |
| Consumptive | Execution_Domain | Assignment | Table Lookup |
| Private | Login_Domain | Immediate | Private |
| | Node_ID | | |
| | Process_Family | | |
| | Process | | |
| | User_Name | | |
| | Product_Name | | |
| | Operating_System | | |
| | Platform_ID | | |
| | Private | | |

FIG. 3

```
Object Identifier Value ::=    {
                                 iso(1)
                                 identified-organization(3)
                                 icd-ecma(12)
                                 member-company(2)
                                 dec(1011)
                                 data-syntaxes(1)
                                 cda(3)
                                 ldif(17)
                               }
Object Identifier Encoding ::= {
                                 0x6, 0x8, 0x2B, 0xC, 0x2,
                                 0x87, 0x73, 0x1, 0x3, 0x11
                               }
```

FIG. 8  LDIF Object Identifier

```
LDIFDocument          ::=   [PRIVATE 16373] IMPLICIT SEQUENCE {
  document-descriptor           [0] IMPLICIT DocumentDescriptor OPTIONAL,
  document-header               [1] IMPLICIT DocumentHeader OPTIONAL,
  document-content              [2] IMPLICIT DocumentContent
                            }
```

FIG. 9  LDIF Document Syntax Diagram

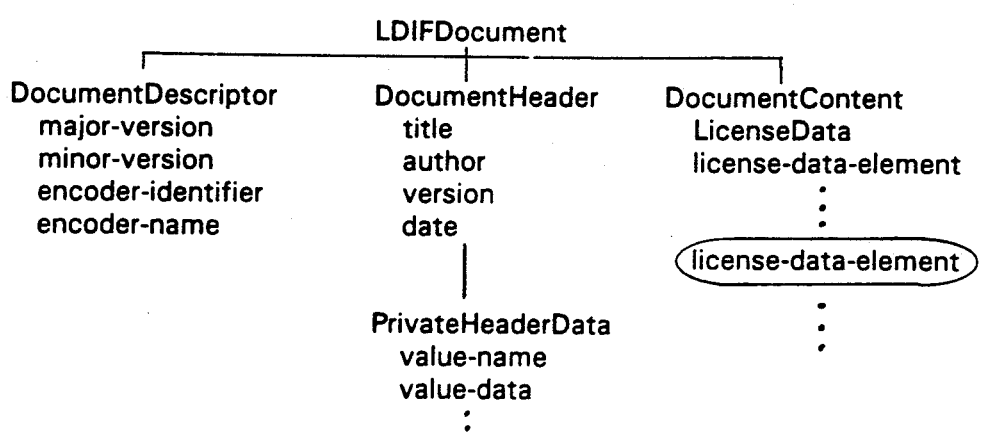

FIG. 10  LDIF Document Structure

```
DocumentDescriptor        ::=       SEQUENCE {
  major-version                       [0] IMPLICIT INTEGER OPTIONAL,
  minor-version                       [1] IMPLICIT INTEGER OPTIONAL,
  encoder-identifier                  [2] IMPLICIT Character-String OPTIONAL,
  encoder-name                        [3] IMPLICIT Character-String OPTIONAL
                                    }
```

FIG. 11    Document Descriptor Syntax Diagram

```
Pakgen DocumentDescriptor ::= {
    major-version 1,
    minor-version 0,
    encoder-identifier "PAKGEN",
    encoder-name {Character-String "PAK Generator V1.0"}
}
```

FIG. 12    Document Descriptor Example

```
DocumentHeader            ::=       SEQUENCE {
  private-header-data                 [0] IMPLICIT NamedValueList OPTIONAL,
  title                               [1] IMPLICIT Character-String OPTIONAL,
  author                              [2] IMPLICIT Character-String OPTIONAL,
  version                             [3] IMPLICIT Character-String OPTIONAL,
  date                                [4] IMPLICIT UTCTime OPTIONAL
                                    }
```

FIG. 13    Document Header Syntax Diagram

```
example-header document-header ::= {
    title {Character-String "PAKGEN Licenses with Associated LURT data"}
    author {Character-String "Tom Jones, Foobar, Inc. License Department"}
    version {Character-String "V0.1"}
    date "198801021100-0500"
}
```

FIG. 14    Document Header Example

```
Document Content              ::= SEQUENCE OF LicenseData

LicenseData                   ::= SEQUENCE {
    license-data-header             [0] IMPLICIT LicenseDataHeader,
    license-body                    [1] CHOICE {
        product-use-authorization           [0] IMPLICIT ProductUseAuthorization,
        license-units-requirements-table    [1] IMPLICIT LURT,
        group-definition                    [2] IMPLICIT GroupDefinition,
        key-registration                    [3] IMPLICIT KeyRegistration,
        issuer-delegation                   [4] IMPLICIT IssuerDelegation,
        license-delegation                  [5] IMPLICIT LicenseDelegation,
        backup-delegation                   [6] IMPLICIT BackupDelegation
                                    },
    management-info                 [2] IMPLICIT ManagementInfo OPTIONAL
                                }
```

FIG. 15    Document Content Syntax Diagram

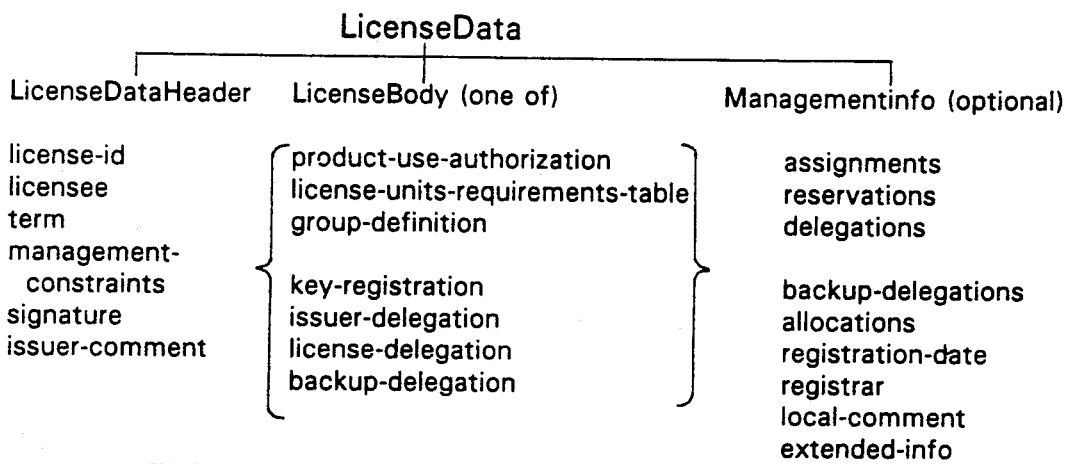

FIG. 16    License Data Structure

```
LicenseDataHeader             ::= SEQUENCE {
    license-id                      [0] IMPLICIT LicenseID,
    licensee                        [1] IMPLICIT Character-String OPTIONAL,
    term                            [2] IMPLICIT Term OPTIONAL,
    management-constraints          [4] IMPLICIT ManagementConstraints OPTIONAL,
    signature                       [5] IMPLICIT Signature,
    issuer-comment                  [6] IMPLICIT NamedValueList OPTIONAL
                                }
```

FIG. 17    License Data Header Syntax Diagram

```
ProductUseAuthorization    ::= SEQUENCE {
    product-id                 [0] IMPLICIT ProductID,
    units-granted              [1] IMPLICIT INTEGER,
    management-policy          [2] IMPLICIT ManagementPolicy,
    calling-authorizations     [3] IMPLICIT SEQUENCE OF Member OPTIONAL,
    caller-authorizations      [4] IMPLICIT SEQUENCE OF Member OPTIONAL,
    execution-constraints      [5] IMPLICIT ExecutionConstraints OPTIONAL,
    product-token              [6] IMPLICIT NamedValueList OPTIONAL
                               }
```

FIG. 18    Product Use Authorization Syntax Diagram

```
LURT                ::= SEQUENCE {
    lurt-name           [0] IMPLICIT Character-String,
    rows                [1] IMPLICIT RowList
                    }
RowList             ::= SEQUENCE OF LurtRow LurtRow             ::= SEQUENCE {
    platform-id         [0] IMPLICIT Character-String,
    lurt-columns        [1] IMPLICIT SEQUENCE OF INTEGER
                    }
```

FIG. 19    License Unit Requirement Table Syntax Diagram

```
Example LURT ::= {
    lurt-name { Character-String "Example LURT"}
    rows {
        LurtRow {
            {Character-String "PC-0"}
            {{10} {230} {-1}}
        LurtRow {
            {Character-String "PC-1"}
            {{12} {230} {-1}}
        LurtRow {
            {Character-String "VAX 6210"}
            {{158} {300} {150}}
    }
}
```

FIG. 20    Example Encoding of LURT

```
Group Definition              ::= SEQUENCE {
    group-name                    [0] IMPLICIT Character-String,
    group-version                 [1] IMPLICIT Version,
    group-release-date            [2] IMPLICIT UTCTime,
    group-members                 [3] IMPLICIT SEQUENCE OF Member
                              }
```

FIG. 21    Group Definition Syntax Diagram

```
KeyRegistration               ::= SEQUENCE {
    key-owner-name                [0] IMPLICIT Character-String,
    key-algorithm                 [1] IMPLICIT Character-String,
    key-value                     [2] IMPLICIT OCTET STRING
                              }
```

FIG. 22    Key Registration Syntax Diagram

```
IssuerDelegation              ::= SEQUENCE {
    delegated-issuer-name         [0] IMPLICIT Character-String,
    delegated-product-id          [1] IMPLICIT SEQUENCE OF Member,
    delegated-units-granted       [2] IMPLICIT INTEGER OPTIONAL,
    template-authorization        [3] IMPLICIT ProductUseAuthorization OPTIONAL,
    sub-license-permitted         [4] IMPLICIT BOOLEAN DEFAULT FALSE
                              }
```

FIG. 23    Issuer Delegation Syntax Diagram

```
LicenseDelegation             ::= SEQUENCE {
    delegated-units                [0] IMPLICIT INTEGER OPTIONAL
    delegated-distribution-control [1] IMPLICIT DistributionControl,
    delegatee-execution-constraints [2] IMPLICIT ExecutionConstraints OPTIONAL,
    assignment-list                [3] IMPLICIT AssignmentList OPTIONAL,
    delegated-data                 [4] IMPLICIT LicenseData OPTIONAL
                              }
```

FIG. 24    License Delegation & Backup Delegation Syntax Diagrams

```
ManagementInfo              ::= SEQUENCE {
    assignments                 [0] IMPLICIT AssignmentList OPTIONAL,
    reservations                [1] IMPLICIT AssignmentList OPTIONAL,
    delegations                 [2] IMPLICIT DelegationList OPTIONAL,
    backup-delegations          [3] IMPLICIT DelegationList OPTIONAL,
    allocations                 [4] IMPLICIT AllocationList OPTIONAL,
    registration-date           [5] IMPLICIT UTCTime,
    registrar                   [6] IMPLICIT Context,
    local-comment               [7] IMPLICIT NamedValueList OPTIONAL,
    termination-date            [8] IMPLICIT UTCTime OPTIONAL,
    extended-info               [9] IMPLICIT NamedValueList OPTIONAL
    }
```

FIG. 25   ManagementInfo Syntax Diagram

```
AllocationList              ::= SEQUENCE OF Allocation

Allocation                  ::= SEQUENCE {
    allocation-context          [0] IMPLICIT Context,
    allocation-lur              [1] IMPLICIT INTEGER,
    allocation-group-id         [2] IMPLICIT INTEGER OPTIONAL
    }
```

FIG. 26   Allocation Syntax Diagram

```
AssignmentList              ::= SEQUENCE OF Assignment

Assignment                  ::= SEQUENCE {
    assigned-units              [0] IMPLICIT INTEGER,
    assignment-term             [1] IMPLICIT Term,
    assignee                    [2] IMPLICIT Context
    }
```

FIG. 27   Assignment Syntax Diagram

```
ContextList               ::= SEQUENCE OF Context

Context                   ::= SEQUENCE OF Subcontext

SubContext                ::= SEQUENCE {
    sub-context-type          [0] SubContextType,
    subcontext-value          [1] ValueData
                              }
SubContextType            ::= CHOICE {
    standard-subcontext-type   [0] IMPLICIT INTEGER {
        network-subcontext(1),
        execution-domain-subcontext(2),
        login-domain-subcontext(3),
        node-subcontext(4),
        process-family-subcontext(5),
        process-id-subcontext(6),
        user-name-subcontext(7),
        product-name-subcontext(8),
        operating-system-subcontext(9),
        platform-id-subcontext(10)
                              }
    private-subcontext         [1] IMPLICIT INTEGER {first(0),last(255)}
                              }
```

FIG. 28   Context Syntax Diagram

| FOOBAR V4.1 Allocated Units ||||
| Units | Context Template || Full Context Specifications |
|       | Node  | User_Name |                              |
| 10    | BLUE  | WYMAN     | ENET, AA_Cluster, BLUE, PID-1..., WYMAN |
| 10    | RED   | OLSEN     | ENET, BB_Cluster, RED, PID-1..., OLSEN |
| 10    | RED   | WYMAN     | ENET, BB_Cluster, RED, PID-2..., WYMAN |
| 10    | GREEN | WYMAN     | ENET, AA_Cluster, GREEN, PID-1..., WYMAN |
|       | GREEN | WYMAN     | ENET, AA_Cluster, GREEN, PID-2..., WYMAN |

FIG. 29   Only unique contexts require explicit unit allocations.

| FOOBAR V4.1 Allocated Units |||
|---|---|---|
| Units | Context Template | Full Context Specifications |
| | Node | |
| 10 | BLUE | ENET, AA_Cluster, BLUE, PID-1..., WYMAN |
| 10 | RED | ENET, BB_Cluster, RED, PID-1..., OLSEN |
| | RED | ENET, BB_Cluster, RED, PID-2..., WYMAN |
| 10 | GREEN | ENET, AA_Cluster, GREEN, PID-1..., WYMAN |
| | GREEN | ENET, AA_Cluster, GREEN, PID-2..., WYMAN |

FIG. 30   Modification of Context_Template impacts units requirements.

```
DistributionControl              ::= SEQUENCE {
    distribution-method             [0] IMPLICIT INTEGER {
        refresh-distribution(1),
        initial-distribution-only(2),
        manual-distribution(3)
                                    },
    current-start-date              [1] IMPLICIT UTCTime OPTIONAL
    current-end-date                [2] IMPLICIT UTCTime OPTIONAL,
    refresh-interval                [3] IMPLICIT IntervalTime OPTIONAL,
    retry-interval                  [4] IMPLICIT IntervalTime OPTIONAL,
    maximum-retry-count             [5] IMPLICIT INTEGER OPTIONAL,
    retries-attempted               [6] IMPLICIT INTEGER OPTIONAL
                                    }
```

FIG. 31   Distribution Control Syntax Diagram

```
ExecutionConstraints ::= SEQUENCE {
    operating-system    [0] IMPLICIT SEQUENCE OF Character-String OPTIONAL,
    execution-context   [1] IMPLICIT ContextList OPTIONAL,
    environment-list    [2] IMPLICIT SEQUENCE OF EnvironmentKind OPTIONAL
                        }
EnvironmentKind     ::= INTEGER {
    batch(1),
    interactive(2),
    local(3),
    network(4),
    remote(5)
                        }
```

FIG. 32   Execution Constraints Syntax Diagram

```
LicenseID                    ::= SEQUENCE {
    issuer                       [0] IMPLICIT Character-String,
    serial-number                [1] IMPLICIT Character-String,
    amendment                    [2] IMPLICIT INTEGER DEFAULT 0
                             }
```

FIG. 33  License ID Syntax Diagram

```
LURDM                        ::= SEQUENCE {
    combination-permitted        [0] IMPLICIT BOOLEAN DEFAULT TRUE,
    overdraft-limit              [1] IMPLICIT INTEGER DEFAULT 0,
    overdraft-logging-required   [2] IMPLICIT BOOLEAN DEFAULT FALSE,
    allocation-size              [3] IMPLICIT INTEGER OPTIONAL,
    lurdm-kind                   [4] IMPLICIT INTEGER {
        lurt(1),
        constant(2),
        private-lurdm(3)
                                 },
    named-lurt-id                [5] IMPLICIT Character-String OPTIONAL,
    lurdm-value                  [6] IMPLICIT INTEGER OPTIONAL,
    default-unit-requirement     [7] IMPLICIT INTEGER OPTIONAL
                             }
```

FIG. 34  License Unit Requirements Determination Method Syntax Diagram

```
ManagementConstraints        ::= SEQUENCE {
    management-context           [0] IMPLICIT ContextList OPTIONAL,
    management-scope             [1] IMPLICIT INTEGER {
        single-platform(1),
        management-domain(2),
        entire-network(3)
                                 } OPTIONAL,
    backup-permitted             [2] IMPLICIT BOOLEAN DEFAULT TRUE,
    delegation-permitted         [3] IMPLICIT BOOLEAN DEFAULT TRUE,
    maximum-delegation-period    [4] IMPLICIT IntervalTime OPTIONAL
                             }
```

FIG. 35  Management Constraints Syntax Diagram

```
ManagementPolicy        ::= SEQUENCE {
    style                       [0] IMPLICIT INTEGER {
        allocative(1),
        consumptive(2),
        private-style(3)
                                },
    context-template            [1] IMPLICIT SEQUENCE OF SubcontextType
                                    OPTIONAL,
    duration                    [2] IMPLICIT INTEGER {
        transaction(1),
        assignment(2),
        immediate(3)
                                } OPTIONAL,
    lur-determination-method    [3] IMPLICIT LURDM OPTIONAL,
    allocation-sharing-limit    [4] IMPLICIT INTEGER OPTIONAL,
    reassignment-constraint     [5] IMPLICIT IntervalTime OPTIONAL
                            }
```

FIG. 36    Management Policy Syntax Diagram

```
Member                  ::= SEQUENCE {
    member-product              [0] IMPLICIT ProductID,
    member-signature            [1] IMPLICIT Signature,
    member-token                [2] IMPLICIT NamedValueList OPTIONAL
                            }
```

FIG. 37    Member Syntax Diagram

```
NamedValue              ::= SEQUENCE {
    value-name                  Character-String,
    value-data                  ValueData
                            }

ValueData               ::= CHOICE {
    value-boolean               [0] IMPLICIT BOOLEAN,
    value-integer               [1] IMPLICIT INTEGER,
    value-text                  [2] IMPLICIT SEQUENCE OF Character-String
    value-general               [3] IMPLICIT OCTET STRING,
    value-list                  [4] IMPLICIT SEQUENCE OF ValueData
                            }

NamedValueList          ::= SEQUENCE OF NamedValue
```

FIG. 38    Named Value, Value Data & Named Value List Syntax Diagrams

```
ExampleList NamedValueList ::= {
    NamedValue {
        value-name {Character-String "Purchase Order"}
        value-data {INTEGER 154493}
    }
    NamedValue {
        value-name {Character-String "Telephone Support #"}
        value-data {Character-String {+1 (999) 555-1234}
    }
}
```

FIG. 39  Named Value List Example

```
ProductID                  ::= SEQUENCE {
    producer                    [0] IMPLICIT Character-String,
    product-name                [1] IMPLICIT Character-String,
    first-version               [2] IMPLICIT Version OPTIONAL,
    last-version                [3] IMPLICIT Version OPTIONAL,
    first-release-date          [4] IMPLICIT UTCTime OPTIONAL,
    last-release-date           [5] IMPLICIT UTCTime OPTIONAL
}
```

FIG. 40  Product ID Syntax Diagram

```
Signature                  ::= SEQUENCE {
    signature-algorithm         [0] IMPLICIT Character-String,
    signature-parameters        [1] IMPLICIT NamedValueList OPTIONAL,
    signature-value             [2] IMPLICIT OCTET STRING
}
```

FIG. 41  Signature Syntax Diagram

```
Term                       ::= SEQUENCE {
    start-date                  [0] IMPLICIT UTCTime OPTIONAL,
    end-date                    [1] IMPLICIT UTCTime OPTIONAL,
}
```

FIG. 42  Term Syntax Diagram

```
Version                 ::= SEQUENCE {
    part-1                  [0] IMPLICIT INTEGER,
    part-2                  [1] IMPLICIT INTEGER DEFAULT 0,
    part-3                  [2] IMPLICIT INTEGER DEFAULT 0,
    part-4                  [3] IMPLICIT INTEGER DEFAULT 0
                        }
```

FIG. 43

| Attributes Specific to Filter | | | | |
|---|---|---|---|---|
| Attribute | Value Syntax | Value Length | Value Number | Value Initially |
| Filter Items | Object(Filter Item) | - | 0 or more | - |
| Filters | Object(Filter) | - | 0 or more | - |
| Filter Type | Enum(Filter Type) | - | 1 | - |

FIG. 44

| Attributes Specific to Filter | | | | |
|---|---|---|---|---|
| Attribute | Value Syntax | Value Length | Value Number | Value Initially |
| Filter Item Type | Enum(Filter Item Type) | - | 1 | - |
| Attribute Type | Type | - | 1 | - |
| Match Value | any | - | 0-1 | - |
| Filters | Object(Filter) | - | 0-1 | - |
| Initial Substring | String(*) | 1 or more | 0-1 | - |
| Substring | String(*) | 1 or more | 0 or more | - |
| Final Substring | String(*) | 1 or more | 0-1 or more | - |
| License Request | Object(License Request) | - | 0-1 | - |

FIG. 45

```
Filter {
    Filter-Type AND
    Filter-Item {
        Filter-Item-Type SELECT
        Attribute-Type Product-Use-Authorization
        Filter {
            Filter-Type AND
            Filter-Item{
                Filter-Item-Type SELECT
                Attribute-Type Calling-Authorization
                Filter{
                    Filter-Type AND
                    Filter-Item {
                        Filter-Item-Type EQUALITY
                        Atribute-Type Producer
                        Match-Value "Digital"
                    }
                    Filter-Item {
                        Filter-Item-Type EQUALITY
                        Attribute-Type Producer
                        Match-Value "Amazing Database"
                    }
                }
            }
            Filter-Item {
                Filter-Item-Type EQUALITY
                Attribute-Type Producer
                Match-Value "Digital"
            }
            Filter-Item{
                Filter-Item-Type EQUALITY
                Attribute-Type Issuer
                Match-Value "Digital"
            }
            Filter-Item {
                Filter-Item-Type EQUALITY
                Attribute-Type Product-Name
                Match-Value "Amazing Graphics System"
            }
        }
    }
}
```

FIG. 46  Example Filter Value Notation

MANAGEMENT INTERFACE FOR LICENSE MANAGEMENT SYSTEM

RELATED CASES

This application is a continuation of application Ser. No. 722,840, filed Jun. 28, 1991, now abandoned.

This application discloses subject matter also disclosed in the following copending applications, all assigned to Digital Equipment Corporation, the assignee of this invention:

Ser. No. 697,652, filed May 8, 1991, by Robert M. Wyman, for LICENSE MANAGEMENT SYSTEM;

Ser. No. 723,456, filed Jun. 28, 1991, by Robert M. Wyman, for LICENSE DOCUMENT INTERCHANGE FORMAT FOR LICENSE MANAGEMENT SYSTEM; and Ser. No. 723,4571, filed Jun. 28, 1991, by Robert M. Wyman for FILTERS FOR LICENSE MANAGEMENT SYSTEM.

BACKGROUND OF THE INVENTION

This invention relates to methods of operation of computer systems, and more particularly to a method and system for managing the licensing of software executed on computer systems.

In U.S. Pat. No. 4,937,863, issued to Robert, Chase and Schafer and assigned to Digital Equipment Corporation, the assignee of this invention, a Software Licensing Management System is disclosed in which usage of Licensed software may be monitored in a computer system to determine if a use is within the scope of a license. The system maintains a database of licenses for software products, and stores a unit value indicating the number of licensing units for each product. When a user wishes to use a licensed product, a message is sent to the central license management facility requesting a license grant. In response to this message, the facility accesses the database to see if a license exists for this product, and, if so, whether units may be allocated to the user, depending upon the user's characteristics, such as the configuration of the platform (CPU) which will execute the software product. If the license management facility determines that a license can be granted, it sends a message to the user giving permission to proceed with activation of the product. If not, the message denies permission.

While the concepts disclosed in the U.S. Pat. No. 4,937,863 are widely applicable, and indeed are employed in the present invention, there are additional functions and alternatives that are needed in some applications. For example, the license management system should allow for simultaneous use of a wide variety of different licensing alternatives, instead of being rigidly structured to permit only one or only a few. When negotiating licenses with users, vendors should have available a wide variety of terms and conditions, even though a given vendor may decide to narrow the selection down to a small number. For example, a software product may be licensed to a single individual for use on a single CPU, or to an organization for use by anyone on a network, or for use by any users at terminals in a cluster, or only for calls from another specific licensed product, or any of a large number of other alternatives. A vendor may have a large number of products, some sold under one type of license and some under others, or a product may be a composite of a number of features from one or more vendors having different license policies and prices; it would be preferable to use the same license management system for all such products.

Distributed computing systems present additional licensing issues. A distributed system includes a number of processor nodes tied together in a network of servers and clients. Each node is a processor which may execute programs locally, and may also execute programs or features (subparts of programs) via the network. A program executing on one node may make remote procedure calls to procedures or programs on other nodes. In this case, some provision need be made for defining a license permitting a program to be executed in a distributed manner rather than separately on a single CPU, short of granting a license for execution on all nodes of a network.

In a large organization such as a company or government agency having various departments and divisions, geographically dispersed, a software license policy is difficult to administer and enforce, and also likely to be more costly, if individual licenses are negotiated, granted and administered by the units of the organization. A preferred arrangement would be to obtain a single license from the software producer, and then split this license into locally-administered parts by delegation. The delays caused by network communication can thus be minimized, as well as budgetary constraints imposed on the divisions or departments. Aside from this issue of delegation, the license management facility may best be operated on a network, where the licensing of products run on all nodes of the network may be centrally administered. A network is not necessary for use of the features of the invention however, since the license management can be implemented on a single platform.

Software products are increasingly fragmented into specific functions, and separate distribution of the functions can be unduly expensive. For example, a spreadsheet program may have separate modules for advanced color graphics, for accessing a database, for printing or displaying an expanded list of fonts, etc. Customers of the basic spreadsheet product may want some, none or all of these added features. Yet, it would be advantageous to distribute the entire combination as one package, then allow the customer to license the features separately, in various combinations, or under differing terms. The customer may have an entire department of the company needing to use the spreadsheet every day, but only a few people who need to use the graphics a few days a month. It is advantageous, therefore, to provide alternatives for varied licensing of parts of features of software packages, rather than a fixed policy for the whole package.

Another example of distribution of products in their entirety, but licensing in parts, would be that of delivering CD ROMs to a customer containing all of the software that is available for a system, then licensing only those parts the customer needs or wishes to pay fees for rights to sue. Of course, the product need not be merely applications programs, operating systems, or traditional executable code, but instead could also include static objects such as printer fonts, for example, or graphics images, or even music or other sound effects.

As will be explained below, calling and caller authorizations are provided in the system according to one feature of the invention, in order to provide technological support for a number of business practices and solve technical problems which require the use of what is called "transitive licensing." By "transitive licensing" is meant that the right to use one product or feature implies a right to use one or more other products or features. Transitive licenses are similar to group licenses in that both types of license consist of a single instrument providing rights of use for a plurality of products. However, transitive licenses differ from group licenses in that they restrict the granted rights by specifying that the licensed products can only be used together and by further specifying one or more permitted inter-product calling/caller relationships. Some examples may help to clarify the use and nature of a transitive license: the examples to be explained are (1) two products sold together, (2) a give-away that results from narrow choices of licensing alternatives, (3) a client licensing method in a client/server environment, (4) impact of modular design, and (5) the impact of distributed design.

A software vendor might have two products for sale: the first a mail system, and the second a LEXIS ™-like content-based text retrieval system. Each of these products might be valued at $500 if purchased separately. Some customers would be satisfied by purchasing the rights to use only one of these products. others might find that they can justify use of both. In order to increase the likelihood that customers will, in fact, purchase both products, it would not be surprising if the software vendor offered his potential customers a volume discount, offering the two products for a combined price of $800. The customers who took advantage of this combined offer would find that they had received two products, each of which could be exploited to its fullest capabilities independently from the other. Thus, these customers would be able to use the content based retrieval system to store and retrieve non-main documents. However, from time to time, the vendor may discover that particularly heavy users of mail wish to be able to use the content based retrieval system only to augment the filing capabilities provided by the standard mail offering. It is likely that many of these potential customers would feel that $800 is simply too much to pay for an extended mail capability. The vendor might then consider offering these customers a license that grants mail users the right to use the content-based retrieval system only when they are using mail and prohibits the use of content based retrieval with any other application that might be available on the customers system. This type of license is referred to below a "transitive license," and it might sell for $600.

Another example is a relational database product (such as that referred to as Rdb ™) designed for use on a particular operating system, e.g., VMS. This relational database product has two components: (1) A user interface used in developing new databases, and (2) a "run-time" system which supports the use of previously developed databases. The developers of the database product might spend quite a bit of effort trying to get other products made by the vendor of the database product to use it as a database instead of having those other products build their own product-specific databases. Unfortunately, the other product designers may complain that the cost of a run-time license for the database product, when added to the cost of licenses for their products, would inevitably make their products uncompetitive. Thus, some mechanism would be needed that would allow one or another of the vendor's products to use the run-time system for the relational database product in a "private" manner while not giving unlicensed access to products of other vendors. No such mechanism existed, prior to this invention; thus, the vendor might be forced to sell the right to use its run-time system for the database product with its proprietary operating system license. Clearly, this combined license would make it possible for the vendor's products to use its database product without increasing their prices; however, it also would make it possible for any customers and third-parties to use the database product without paying additional license fees. However, had the system of the invention been available, the vendor could have granted transitive licenses for the run-time component of its database product to all the vendor's products. Essentially, these licenses would have said that the database run-time could be used without an additional license fee if and only if it was used in conjunction with some other of the vendor's products. Any customer wishing to build a new relational database application or use a third-party application that relied on the vendor's database product would have had to pay the vendor for its database run-time license.

A proposed client/server licensing method provides yet another example of a problem which could be solved by transitive licensing. Typically, a client is only used by one user at a time, while a server can support an arbitrary number of clients depending on the level of client activity and the capacity of the machine which is supporting the server. While traditionally, server/client applications have been licensed according to the number of clients that a server could potentially support, this may not be the most appropriate method for licensing when the alternatives afforded by the invention are considered. The business model for the proposed client/server method requires that each client be individually licensed and no explicit licensing of servers is required to support properly licensed clients. Such a licensing scheme makes it possible to charge customers only for the specific number of clients they purchase. Additionally, it means that a single client can make use of more than one server without increasing the total cost of the system. The solution to this transitive licensing problem would be to provide a mechanism that would allow the clients to obtain license unit allocations and then pass a "proof" of that allocation to an servers they may wish to use. Servers would then support any clients whose proofs could be verified to be valid. On the other hand, if a client that had not received a proof of allocation attempted to use a server, the server would obtain a license allocation for that client session prior to performing any services. Such a solution has not been heretofore available.

As the complexity and size of the software systems provided to customers increases, it is found that the actual solution provided to customers is no longer a single product. Rather, customers are more often now offered solutions which are built up by integrating an increasing number of components or products, each of which can often stand alone or can be part of a large number of other solutions. In fact, a product strategy may rely almost exclusively on the vendor's engineering and selling a broad range of specialized components that can only be fully exploited when combined together with other components into a larger system. Such components include the relational database run-time system mentioned above, mail transport mechanisms, hyperinformation databases, document format conversion services, time services, etc. Because these components are not sold on their own merits, but rather on their ability to contribute to some larger system, it is unlikely that any one customer will be receiving the full abstract economic value of any one of the components once integrated into a system. Similarly, it can be observed that the value of any component once integrated into a larger system varies greatly from system to system. Thus, it may be found that a mail transport mechanism contributes a large part of a system whose primary focus is mail, however, it will contribute proportionally less of the value of a system that provides a broader office automation capability. As a result of these observations, the job of the business analyst who is attempting to find the "correct" market price for each component standing on its own, is more complex. In reality, the price or value of the component can only be determined when considering the contribution of that component to the full system or solution in which it is integrated. Attempting to sell the components at prices based on their abstract, independent values will simply result in overpriced systems.

Transitive license styles are particularly suited to dealing with pricing of modular components, since component prices can be clearly defined in relation to the other components or systems which they support. Thus, a vendor can charge a price of $100 for the right to use a mail transport system in conjunction with one product, yet charge $200 for the use of the same mail transport system when used by another product.

In addition to the "business" reasons for wanting to support transitive licensing, there is also a very good technical reason that arises from the growing tendency of developers to build "distributed products" as well as the drive toward application designs that exploit either tightly or loosely coupled multiprocessor systems; the availability and growing use of remote procedure calls has contributed to this tendency. This technical problem can be seen to arise when considering a product which has a number of components, each of which may run in a different process space and potentially on a different computer system. Thus, there might be a mail system whose user interface runs on one machine, its "file cabinet" is supported by a second machine and its mail transport system runs on yet a third machine. The simple question which arises is: "Which of the three components should check for licenses?" Clearly it must be ensured that no single component can be used if a valid license is not present. Thus, the answer to the question will probably be that all three components should check for licenses. However, the question is then presented: "Where are the licenses to be located?". This can become more complex.

Increasingly, the distributed systems being built are being designed so that it is difficult to predict on which precise machine any particular component will run. Ideally, networks are supposed to optimize the placement of functions automatically so that the machine with the most available resource is always the one that services any particular request. This dynamic method of configuring the distribution of function servers on the network makes it very difficult for a system or network manager to predict which machines will run any particular function and thus very difficult for him to decide on which machines software licenses should be loaded.

Even if a system manager could predict which machines would be running the various application components and thus where the license units should be loaded, the situation would still be less than ideal. The problem arises from the fact that each of the components of the application would be independently making requests for license unit allocations. This behavior will result in a difficult problem for anyone trying to decide how many license units are required to support any one product. Given the mail example, the problem wouldn't exist if it were assumed that all three components (i.e., user interface, file cabinet, and transport system) were required by the design of the mail system to be in use simultaneously. If this were the case, it could be simply assumed that supporting a single activation of the mail system would require three units. However, in a real mail system, it will be inevitably discovered that many users will only be using just the user-interface and file-cabinet components of the system at one time. Thus, there will be some unused units available which could be used to authorize additional users. This situation might not be what is desired by the software vendor.

The problem of providing license support to multi-component products which are dynamically configured could be solved by viewing each of the product components as a distinct licensable product and by treating the problem as one of transitive licensing, but a mechanism for accomplishing this has not been available. Essentially, a single license document would be created that stated that if any one of the components had successfully obtained a license to run, it could use this grant to give it the right to exploit the other components. Thus, in the example above, the user might start the mail system by invoking its user interface. This user interface code would then query the license management facility for a license allocation and once it has receive that allocation, it would pass a proof of allocation to the other mail components that it uses. Each of the other components would request that the license management system validate that the "proof" is valid prior to performing any service; however, none of the other components would actually require specific allocations to be made to them. In this way, the complexity of licensing and managing networks of distributed applications can be significantly reduced.

SUMMARY OF THE INVENTION

In accordance with one embodiment of the invention, a license management system is used to account for software product usage in a computer system. The system employs a license management method which establishes a management policy having a variety of simultaneously-available alternative styles and contexts. A license server administers the license, and each licensed product upon start-up makes a call to the license server to check on whether usage is permitted, in a manner similar to that of U.S. Pat. No. 4,937,863. The license server maintains a store of the licenses, called product use authorizations, that it administers. Upon receiving a call from a user, the license server checks the product use authorization to determine if the particular use requested is permitted, and, if so, returns a grant to the requesting user node. The license server maintains a database of product use authorizations for the licensed products, and accesses this database for updating and when a request is received from a user. While this license management system is perhaps of most utility on a distributed computer system using a local area network, it is also operable in a stand-alone or cluster type of system. In a distributed system, a license server executes on a server node and the products for which licenses are administered are on client nodes. However, the license management functions and the licensed products may be executing on the same processor in some embodiments.

The product use authorization is structured to define a license management policy allowing a variety of license alternatives by components called "style", "context", "duration" and "usage requirements determination method". The style may be allocative or consumptive. An allocative style means the units of the license may be allocated temporarily to a user when a request is received, then returned to the pool when the user is finished, so the units may be reused when another user makes a request. A consumptive style means the units are deducted from an available pool when a user node makes a valid request, and "consumed", not to be returned for reuse. The context value defines the context in which the use is to be allowed, such as on a particular network, by a particular type of CPU, by a particular user name, by a particular process, etc. The duration value (used in conjunction with the style component) concerns the time when the license units are to be deducted from the available pool of units, whether at the time of request, after a use is completed, etc. A usage requirements determination method may be specified to define or provide information concerning the number of license units charged in response to a license request from a user node; for example, some CPU platforms may be charged a larger number of license units than others. A table may be maintained of usage requirements, and the determination method may specify how to access the table, for example. The important point is that the user node thus the software product) can only make a request, identifying itself by user, platform, process, etc., and the license management facility calculates whether or not the license can be granted (that is, units are available for allocation), without the user node having access to any of the license data or calculation. There is a central facility, the license server, storing the license documents, and, upon request, telling the licensed products whether they can operate under the license terms.

An important feature of one embodiment is that the license administration may be delegated to a subsection of the organization, by creating another license management facility duplicating the main facility. For example, some of the units granted in the product use authorization may be delegated to another server, where the user nodes serviced by this server make requests and receive grants.

The license management facility cannot create a license itself, but instead must receive a license document (a product use authorization) from an issuer of licenses. As part of the overall license management system of the invention, a license document generator is provided which creates the product use authorizations under authority of the owner of the software, as negotiated with customers. Thus, there are three distinct rights in the overall license management facility of the invention; (10 the right to issue licenses, (2) the right to manage licenses, and (3) the right to use the licensed products. Each one of these uses the license document only in prescribed ways. The license issuer can generate a license document. The license manager (or license server as referred to herein) can grant products the right to use under the license, and can delegate parts of the licensed units for management by another server, as defined by the license document; the way of granting rights to products is by responding to certain defined calls from the products. And, the licensed products can make certain calls to the license server to obtain grants of rights based upon the license document, inquire, or report, but ordinarily cannot access the document itself.

As explained above, transitive licensing is an important feature of one embodiment. This is the provision of a mechanism for one user node to get permission to use another software product located on another user node; this is referred to as a calling authorization and a caller authorization, using a "calling card," and these are examples of the optional features which must be specifically permitted by the product use authorization. A user node must obtain permission to make a procedure call to use a program on another node; this permission is obtained by a request to the license server as before, and the permission takes the form of a calling card. When a calling card is received by a second node (i.e., when the procedure call is made), a request is made by the second node to the license server to verify (via the product use authorization )that the calling card is valid, and a grant sent to the user node if allowed. In this manner, all nodes may have use of a program by remote calls, but only one consumes license units.

Another important feature of one embodiment is a management interface which allows a license manager to modify the license policy components of a license document maintained by a license server in its database. Usually the license manager can only make modifications that restrict the license policy components to be more restrictive than originally granted. Of course, the management interface is used to make delegations and assignments, if these are authorized.

The license document interchange format is an important feature, in that it allows the license management system to be used with a wide variety of software products from different vendors, so long as all follow the defined format. The format uses data structures that are defined by international standards.

An important function is the filter function, used in the management interface and also in the client interface to select among elements in the data structures.

BRIEF DESCRIPTION OF THE DRAWINGS

The novel features believed characteristic of the invention are set forth in the appended claims. The invention itself, however, as well as other features and advantages thereof, will be best understood by reference to the detailed description of specific embodiments which follows, when read in conjunction with the accompanying drawings, wherein:

FIG. 2 is a diagram of the content of a license document or "product use authorization" generated by the license document generator and stored by the license server in the system of FIG. 1;

FIG. 3 is a diagram of the alternatives for license style, context and duration making up the license management policy implemented in the system of FIG. 1, according to one embodiment of the invention;

FIG. 4 is a diagram of an example of a fragment of a license use requirements table (LURT) used in the system of FIG. 1, according to one embodiment of the invention;

FIG. 8 is a diagram of an LDIF document identifier, according to an standard format;

FIG. 9 is a syntax diagram of an LDIF document;

FIG. 10 is a diagram of an LDIF document structure;

FIGS. 11, 13, 15, 17, 18, 19, 21-28 and 31-43 are syntax diagrams for elements of various ones of the LDIF data structures;

FIG. 16 is a diagram of a license data structure;

FIGS. 12, 14 and 20 are examples of description of data elements using a standard notation;

FIGS. 29 and 30 are examples of context templates used in the license management system;

FIGS. 44 and 45 are tables of attributes specific to filter and filter item type; and FIG. 46 is notation in a standard format for an example of a filter.

DETAILED DESCRIPTION OF SPECIFIC EMBODIMENTS

Figure 1:
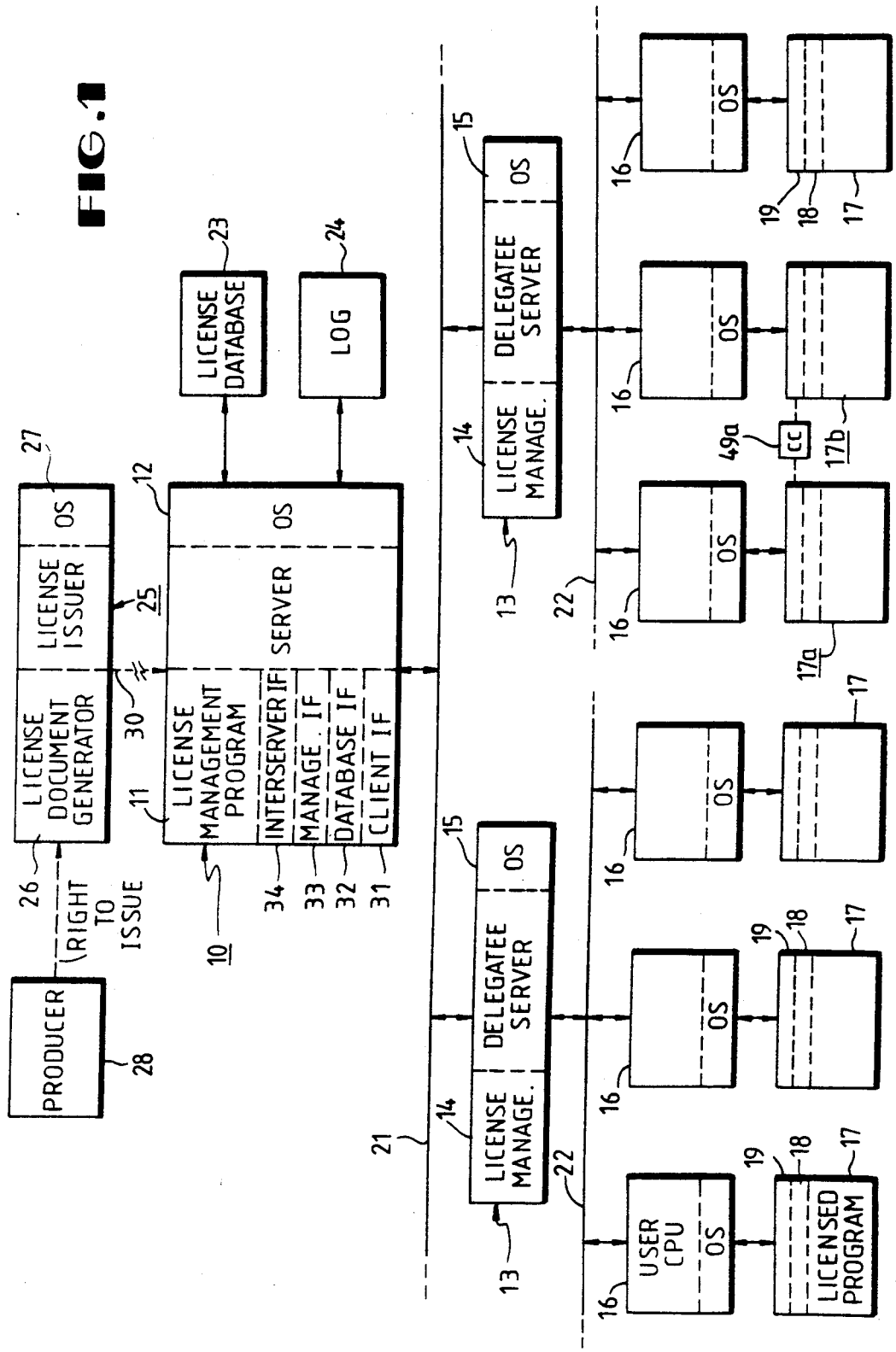
FIG. 1 is a diagram in block form of a distributed computer system which may be used to implement the license management operations according to one embodiment of the invention.

Referring to FIG. 1, a license management facility according to one example embodiment of the invention is centered around a license server 10, which typically includes a CPU located in the customer's main office and executing a license management program 11 as will be described, under an operating system 12. The license server 10 communicates with a number of delegatees 13 which likewise include CPUs in departments or division of the company or organization, each also executing a license management program 14 under an operating system 15. The license management program 14 is the same as the program 11 executing on the main server 10; the only difference in the functions of server 10 and servers 13 is that the latter have a delegated subset of the license units granted to the server 10, as will be described. The CPUs 13 are in turn servers for a number of users 16, which are CPU nodes where the licensed programs 17 are actually executed. The programs 17 executing on the user CPUs 16 are applications programs (or operating systems, etc.) which have added to them units 18 and 19, according to the invention, allowing them to make inquiry to the their server 13 (or 10) before executing and to report back after executing, using a client stub 19 in the manner of remote procedure calls, in one embodiment. A user node 16 may have man different programs 17 that may be executed, and the various user nodes 16 would usually each have a set of programs 17 different from the other user nodes, all of which would be administered by the license management program 14 or 11. The terms "program" and "licensed product" are used in reference to the element 17, but it is understood that the products being administered may be segments of programs, or functions or features called by another program, or even merely data (such as printer fonts), as well as complete stand-alone applications programs. The license server 10 communicates with the delegatee servers 13 by a network 21, as is usual in large organizations, and the delegatee servers 13 each communicate with their user nodes 16 by networks 22; these networks may be of the Ethernet, token ring, FDDI types or the like, or alternatively, the user nodes 16 may be merely a cluster of terminals on a multiuser system with the delegatee being a host CPU. The particular hardware construction of the user nodes, server nodes, communication networks, etc., and the operating systems 12 or 15, are of no concern regarding the utility of the features of the invention, the only important point being that the user CPUs 16 of the software products 17 in question can communicate readily and quickly with their respective server nodes 13 or 10. In one embodiment, remote procedure calls (RPCs) are used as the communication medium for the interfaces between components of the system, handling the inquiries and grants as will be described. A remote procedure call is similar to a local procedure call but is made to a procedure located on a remote node, by way of a communications network.

The function of the unit 19 is that of a client stub, in a remote procedure call sense. The calls to the license server 10 are made through this stub 19, and returns are received by the stub 19 and passed on to the program 17. The stub 19 is responsible for obtaining the network addresses of other nodes on the network, such as the server 10. Also, the stub 19 is responsible for determining the context (as defined below) for passing on to the server 10. The unit 18 functions to execute a "private" type of license availability determination if this is used, rather than this task being done by the application program 17, but if the ordinary method of determination is employed (using the license server) as is usually the case, the unit 18 is merely code that starts the execution and passes calls and returns back and forth between the program 17 and the unit 19.

The license server 10, using the license management program 11, maintains a license data file 23 comprising a number of license documents or licenses (product use authorizations), and also maintains a log 24 which is a record of the usage activity of all of the user CPUs 16 of each of the licensed programs. The delegatee servers 13 would maintain similar license databases and logs. The license server 10 has no authority to originate a license, but instead must receive a license from a license issuer 25. The issuer 25 is again a CPU executing a license document generator program 26 under an operating system 27. The license issuer 25 may be under control of the producer 28 of the programs or software products being licensed, or may be controlled by a distributor who has received the authority to grant licenses from the producer or owner 28. The communications link 30 between the license issuer 25 and the license server 10 for delivering the license document may be in the form of a network, or may be a phone line using modems, or may include physical delivery by disks or CD ROMs, for example. Likewise, the method of delivery of the software products being licensed, i.e., the applications programs 17 to be executed on the CPUs 16, is not material to the license management facility of the invention; the products are delivered by some appropriate means, e.g., the communications line 30 and the networks 21 and 22, by CD ROMs or disks physically distributed, etc.

Although shown in FIG. 1 as operating on a distributed system, in the simplest case the license management facility of the invention may be operated on a single CPU. The license management program 11 and the applications program 17 may be executing on the same CPU, in which case the license document would be stores in a database 23 as before, on this CPU, and the calls from the unit 18 to the license server would be local instead of RPCs. As in the distributed system, however, the licensed product would still not have access to the license document, but instead could only make inquires to the server program, even if all are executing on the same CPU.

In operation of the distributed system of FIG. 1, the producer 28 gives the issuer 25 authority to grant licenses on its behalf (the producer and issuer can be a single entity or multiple entities). The license document generator program 26, under control of a user (a person), generates a license (usually the result of negotiation between the user of program 26 and a user of the server 10). This license is called a product use authorization, and it is transmitted by the link 30 to the server 10. The license management program in the server 10 stores the product use authorization in the database 23, and, if delegation is an authorized option, may distribute parts of the authorized use to the delegatee servers 13, where it is likewise stored in a database. Thereafter, administration of the license is only in response to inquiries from user nodes 16. When execution of a program 17 begins, the unit 18 is invoked to check on the availability of a license for this particular node. The unit 18 sends (as by an RPC) a request to the license management program 14 (or 11 if there is no delegatee), where the product use authorization stored in database 23 is checked to see if use if authorized. If so, a return is sent to the user node 16, granting permission to continue. When the program 17 has finished executing, the unit 18 again is invoked to signal to the license management program, again by an RPC, that the authorization is released, so the license management program can take appropriate action, e.g., log the use in log 24, etc.

To implement these operations, the license management program 11 or 14 contains several functions, including a client interface 31, a database interface 32, a management interface 33, and an interserver interface 34 for communicating with the delegatees 13 (if any). The client interface 31, as described below, handles the requests received from the user nodes 16, and returns resulting from these requests. The database interface 32 handles the storing and retrieval of license information in the database 23, and logging license usage activity to log 24, and retrieval of this data. The management interface 33 handles the tasks of receiving the product use authorizations from the issuer 25 and maintaining the database 23 via the database interface 32. The interserver interface 34 handles the task of communicating with the delegatee servers 13, including transmitting the assigned parts of the product use authorizations, or communicating with other license servers that may be separately executing the license management function; for example, calls for validating calling cards may be made to another such server. If there are no delegatees or no other license servers, then of course the interserver interface 34 has no function, and is idle.

The license document or "product use authorization" forming the basis for the license management activity of the program 11 on the server 10 may be illustrated as a data structure containing the information set forth in FIG. 2; in actual practice the product use authorization is preferably a more abstract data arrangement, not in such a rigidly structured format as illustrated. For example, the product use authorization as well as similar documents stored in the database 23, or passed between components of the system of FIG. 1, may be of the so-called tag-length-value data format, where the data structure begins with an identifying tag (e.g., PUA or product use authorization) followed by a field giving the length, followed by the value itself (the content). One type of data treatment using this tag-length-value format is an international standard referred to as ASN.1 or Abstract Syntax Notation,. In any event, the document 35 illustrated in FIG. 2 is merely for discussing the various items of data, rather than representing the way the information is stored. Some of the fields shown here exist at some times and not others, and some are optional; the product use authorization may also include additional fields not shown or discussed here. Also it should be noted that copies of parts of this type of document are made for the delegatees, so this representation of FIG. 2 is a composite of several documents used in the system of FIG. 1. The document 35 includes fields 36 identifying the software product by product name, producer, version numbers, release date, etc. The issuer 25 is identified in field 37, and the licensee (usually the owner of the license server 10) identified in field 38. The essential terms of the license grant are then defined in fields 40-46. The start date and end date are specified in fields 40; these store the exact time (date, hour, minute, second, etc.) when the license becomes valid and when it ends, so licenses may be granted to start at some future time and to end at a particular time. Note that the previous practice has been to specify only the ending date, rather than also a start date as employed here. Each of the nodes, including issuer 25, servers 10 and 13, and user nodes 16, maintain a time value by a local clock referenced to a standard, so inherent in the license management facility is the maintaining of a time standard to compare with the start and end date information in the fields 40. The units granted are specified in field 41; the units are an arbitrary quantitative measure of program usage. In a delegatee server 13, the units field 41 will have some subset of the units field in the original product use authorization. As units are granted to users 16 or delegated, the remaining units available for grant are indicated in a subfield 42 in the copy of the document used by the server. The management policy occupies fields 43-46, and includes style, context, duration and LURDM (license use requirements determination method), as will be explained. The style field 43 specifies whether the licensed units are controlled by an "allocative" style or "comsumptive" style, or some other "private" algorithm, where styles are ways used to account for the consumption or allocation of the units. The context field 44 specifies the location and environment in which product use or license management occurs, i.e., a CPU or an individual user or a network, etc. Duration field 45 indicates whether the license granted to a user is by assignment, by transaction, or immediate. The LURDM field 46 indicates the license use requirements determination method, in some cases using a license use requirements table (LURT) seen as field 47, as will be described.

Additional fields 48-54 in the product use authorization 35 of FIG. 2 define features such as delegation authorization, calling authorization, overdraft authorization, combination authorization, token, signature, checksum, etc. These will be described in the following paragraphs.

In the delegation field 48 is true, a license server 10 may distribute license units to multiple servers 13. A time limit may be imposed, i.e., units can be delegated to other hardware systems until they time out. Delegation allows an administrator to distribute units to improve response time and increase the resilience of the system. For example, the communication network 21 may include a satellite link to a remote facility where the local server 13 has a number of clients or users 16, in which case the calls to the server 13 would be completed much quicker than would be the case if calls had to be made to the server 10. Also, delegation may be used as a method of allocating licensed units within a budget for administrative purposes. Usually the delegation authorization is a feature that is priced by the issuer, i.e., a license granting 1000 units with delegation authorization is priced higher than without this authorization.

The field 49 contains a calling authorization and/or a caller authorization. If the caller authorization in field 49 is true, the product is permitted to receive calls from other named products requesting use of the product, and if conditions are met (identified caller is authorized) the server can grant a calling card, as described below. If the calling authorization is true, the product can make calls to other products. If neither is true, then the product can neither make or receive calls using the calling card feature. Referring to FIG. 1, if product 17a wishes to make a remote procedure call to a feature of product 17b running on a different user node 16, it makes a call to its server 13 including a request for a calling card, and if permitted, the return to product 17a includes a calling card 49a. The product 17a then makes a call to product 17b in the usual manner of RPCs, sending along the calling card 49a, which the product 17b then verifies by a call to its server 13 before executing the called procedure and issuing its return to product 17a. The feature of calling cards is important for distributed applications. For example, if a product is able to execute faster in a distributed system by assigning tasks to other CPUs, then the issue is presented of which license policy is needed, i.e., does every node executing a part of the task have to be licensed and consume or receive allocation of a unit, or just the one managing the task? This is resolved for most applications by use of this calling card concept. The product use authorization for such a product has the calling authorization field 49 enabled, so calling cards can be issued. This feature is typically separately priced.

The combination authorization field 50 of FIG. 2 determines whether or not license requests from a user node 16 can be satisfied by combining units from multiple product use authorizations. It may be advantageous to purchase licenses with different policy values, and use units from certain product use authorizations only for overflow or the like. Or, for other reasons, it may be advantageous to "borrow" and "lend" units among delegated servers or user nodes. This function is permitted or denied by the content of field 50.

The overdraft field 51 determines whether or not a requested allocation from a user node 16 will be nevertheless granted, even though the units available field 42 is zero or too small to permit the requested use. Overdrafts can be unlimited, or a specific overdraft pool can be set up by a server 10, for a customer's internal administrative purposes. That is, the overdraft value may be unlimited in the original license, but limited or zero for internally distributed copies of the license. Thus, the product use authorization sent by the issuer 25 to the customer may have overdrafts permitted by the field 51, but the customer may deny overdraft permission for its own budgeting purposes. In any event, if overdraft is permitted, additional fees have to be paid to the issuer at some accounting period, when the logged usage from log 24 indicates the available units have been exceeded. If overdraft is denied, then the units 18 of the user nodes making request allocations are structured to inform the product 17 that a license grant is not available. The intent is not to prevent the application program from running; the license server merely informs the application whether or not the license manager determines that it is authorized to run. The application can itself be structured to shut itself down if not authorized to run, or it can be structured to shut down certain functions (e.g., ability to save files, ability to print, etc.), or it can be structured to continue in a fully functional manner. The purpose of the license management facility is not that of enforcement, nor that of "copy protection", but instead is merely that of license management.

An optional token field 52 is available in the product use authorization 35 of FIG. 2. This field can contain comments or other information desired by the issuer or user. For example, a telephone support number may be included in the token field, then when the product 17 shows its "help screen" the number is inserted. This number would be part of the argument, i.e., data transmitted to the user node 16, when the server 10 makes a return following a request allocation message from the user. This field may also be used to store information used in a "private" style, where the information from this field returned to the user node is employed by the application program 17 or the stub 19 to determine if the application can be activated.

The signature field 53 in the product use authorization 35 is a part of a validation mechanism which provides important features. This field contains a digital signature encoded to reflect the data in the license itself, as well as other missing line encoding methods encoding algorithm is known. In a preferred embodiment, a so-called "public/private key" system of encoding is used for the signature field 53. The encoding algorithm used to generate the signature 53 is known to the issuer 25, using a private key, and anyone knowing the public key can decode the signature to determine if it is valid but cannot determine the encoding algorithm so it cannot produce a forged signature. So, if the server 10 knows the public key which is unique to the issuer 25, it can determine if a license document 35 is genuine, but it cannot itself generate license documents. However, if the server possesses a valid license document that gives it the right to delegate, then it will be assigned its own private kay(different from all other issuers or servers) and its delegatees 13 will be able to determine if a valid delegated license is delivered to them as they will be given the public key for the servers 13. The field 53 will thus contain both the original signature from the issuer 25 and the license server's signature when delivered to a delegatee 13. The decoding algorithm using a public key for any signatures is thus used by the license server 10 or delegatee 13 to make sure a product use authorization 35 is authentic before it is stored in the database 23. Related to the digital signature 53 is a checksum field 54, which merely encodes a value related by some known algorithm to the data in the product use authorization 35 itself. This field may be used merely to check for corruption of the data as it is stored, recalled, and transmitted with the system. That is, the checksum is used for data validation rather than security.

Two concepts central to the license management system implemented using the license document or product use authorization 35 of FIG. 2 are the "license units", specified in field 41 or 42 and the "context", specified in field 44. License units are an abstract numerical measure of product use allowed by the license. When a product 17 (or a function or feature of a product) makes a license-checking request, the license management program 11 on server 10 computes how many license units are required to authorize this particular use of the product, and this is the license units requirement, in some cases using the LURDM field 46. A "context" is a set of tagged values which define the location and environment in which product use or license management occurs. Context values may be specified in field 44 of the product use authorization 35 of FIG. 2 to restrict the environments in which the license may be managed and in which product use may occur. A context template may also be specified in the field 44 to indicate which parts of the complete context of product use (sub-contexts) are significant in differentiating product uses for the purposes of unit allocations; when this is specified, it allows separate product uses to share license.units in a controlled way.

The two general types of policies specified in field 43 are allocative and consumptive. An allocative policy grants to the holder a specific number of license units (field 41) and specifies the policy which must be used to account for the allocation of these units. A software product 17 which is being managed by an allocative license will require verifications that the appropriate number of license units have been allocated to it prior to performing services to the user. Typically, this allocation of units occurs either at the time of activation of the product 17 or at the time that product use is enabled on a particular platform (user CPU 16). The units typically remain allocated to the product 17 throughout the period that the product is running or is enabled to run. Upon termination of processing or disabling, the allocated units are deallocated and made available for allocation to other instances of the software product 17 (other users 16 activating the product). In general, as long as any license units remain unallocated in field 42, the holder of the license is contractually authorized to increase his utilization of the licensed product. The usage does not deplete the license, however, as the units are returned to the units-available field 42 after a user is finished, and can be granted again to another user.

A consumptive unit based license, indicated in policy field 43, grants to the holder a specific number of initial license units (from field 42) and specifies the policy used to account for the consumption of those units. A software product 17 which is being managed by a consumptive license will cause an appropriate number of license units to be consumed to reflect the services provided by the product. Once consumed, units cannot be reused. Thus, the number of units available for future use declines upon every use of the licensed software product 17. This may also be referred to as a "metered" policy, being conceptually similar to measured consumption of electricity, water, etc. When the number of available units in field 42 reaches zero, the license may require that further use of the product is prohibited, or, the agreement may permit continued decrementing of the number of available units; the result is the accumulation of a negative number of available units in the field 42. It is anticipated that most consumptive unit based licenses will consider negative units to represent an obligation of the license holder to pay the license issuer 25. The transaction log 24 maintains an audit trail for providing a record of the units used in a consumptive license.

Referring to FIG. 3, the major elements of the management policy are set forth in a table, where the possible entries for the fields 43, 44, 45 and 46 are listed. For the style entry 43, the possibilities are allocative and consumptive as just described, plus a category called "private" which represents a style of management undefined at present but instead to be created especially for a given product, using its own unique algorithm. It is expected that most licenses may be administered using the named alternatives of FIG. 3, but to allow for future expansion to include alternatives not presently envisioned, or to permit special circumstances for unique software, the "private" choices are included, which merely mean that the product 17 will generate is own conditions of use. It is important to note that, except for the "private" alternative, the license management is totally in control of the license management program 11 on the license server 10 (or delegatee 13), rather than at the product 17. All the product 17 does, via the unit 18, is to make the request inquiry to the server 10 via the client interface 31, and report when finished.

The context field 44 specifies those components (sub-contexts) of the execution-context name which should be used in determining if unit allocations are required. License data is always used or allocated within, or for the benefit of, some named licensing context, and context can include "platform contexts" and "application contexts". Platform contexts are such things as a specific network, an execution domain, a login domain, a node, a process ID or a process family, a user name, a product name, an operating system, a specific hardware platform, as listed in FIG. 3. Applications contexts are information supplied form the application (the product 17), such as may be used in a "private" method of determining license availability. The context name can use several of these, in which case the context name is constructed by concatenating the values of all subcontexts into a single context name, e.g., a VAX 3100 platform using VMS operating system.

The duration field 45 defines the duration of an allocation of license units to a specific context or the duration of the period which defines a valid consumptive use. For durations of type "Assignment," the specification of a reassignment constraint is also provided for, as discussed below. There are three types of duration, these being "transaction," "assignment" and "immediate" as seen in FIG. 3.

The transaction duration type, when specified for an allocative policy, indicates that license units should be allocated to the specified context upon receipt of a license request and that those units should be deallocated and returned to the pool of available units upon receipt of a corresponding license release from a user node 16. Abnormal termination of the process or context having made the original license request will be semantically equivalent to a license release. On the other hand, when specified for a consumptive policy, this duration type indicates that license units should be allocated to the specified context upon receipt of a license request and permanently removed from the available unit pool (field 42) upon receipt of a license release which reflects successful completion of the transaction. Upon receipt of a license release which carries an error status or upon abnormal termination of the processor context having made the original license request, the allocated units will be deallocated and returned to the pool of available units (field 42).

The assignment duration type in FIG. 3 (field 45 of FIG. 2) imposes the constraint that the required units must have been previously assignment are those given in the contest-template. A "reassignment constraint" may be imposed, and this is a limitation on how soon a reassignment can be made. For example, a reassignment constraint of 30- days would require that units assigned to a specific context could not be reassigned more of ten that every 30- days; this would prevent skirting the intent of the license by merely reassigning units whenever a user of another context made a request allocation call for the product. Related to this assignment constraint, a "reallocation limit" may also be imposed, to state the minimum duration of an allocation; where there is a context template of process, the intent is to count the number of uses of the software product at a given time, but where software runs in batch rather than interactive mode it may run very quickly on a powerful machine, so a very few concurrent uses may permit almost unlimited usage - by imposing a reallocation constraint of some time period, this manner of skirting the intent of the license may be constrained.

The immediate duration type (field 45 of FIG. 2) is used to indicate that the allocation or consumption of an appropriate number of license units from the pool of available units (field 42) should be performed immediately upon receipt of a license request. Receipt of license release or abnormal terminations will then have no impact on the license management system. When specified as the duration of r an allocative policy, the effect will be simply to check if an appropriate number of license units are available at the time of a license request. When specified as the duration for a consumptive policy, the effect will be to deduct the appropriate number of license units from the available pool at the time of a license request, and, thereafter, abnormal termination, such as a fault at the user CPU 16 or failure of the network link, will not reinstate the units.

The LURDM or license unit requirement determination method, field 46, has the alternatives seen in FIG. 3 and stores information used in calculating the number of units that should be allocated or consumed in response to a license request. If this field specifies a table lookup kind, this means license unit requirements are to be determined by lookup in the LURT (field 47) which is associated with the current license. If a constant kind if specified, this indicates that the license units requirement are constant for all contexts on which the licensed product or product feature may run. A private LURDM specifies that the license unit requirements are to be determined by the licensed product 17, not by the license management facility 11. The license unit requirements tables (LURTs) provide a means by which issuers of licenses can store information describing the relation between context (or row selector) and unit requirements. The license units requirements determination method (LURDM) must specify "table lookup" for the LURT to be used, and if so a row selector must be specified, where a valid row selector is any subcontext, e.g., platform ID, user name, time of day, etc. An example of an LURT fragment is shown in FIG. 4, illustrating the license unit requirements table mechanism. In this example, the row selector is "platform-ID" so the platform-ID value determines which row is used. The issuer of this LURT of FIG. 4 has established three unit requirement tiers for use in determining the unit requirements for that issuer's products. The reason for the tiers is not mandated by the license management system, but the issuer 25 (actually the user of the program 26) would probably be establishing three pricing tiers, each reflecting a different perspective on the relative utility of different platforms in supporting the use of various classes of product 17. The first column in FIG. 4, Column A, specifies the use requirements for a class of products whose utility is highly sensitive to the characteristics of the specific platform on which they are run. This can be seen by observing that the unit requirements are different for every row in Column A. Products which use the second column (Column B) appear to have a utility which is more related to the class of platform on which they run. This is indicated by the fact that all the PC platforms share a single value which is different form that assigned to the VAX platform. The final column (Column C) is for use with a class of products which is only supported on the VAX platform. FIG. 4 is of course merely an example, and the actual LURT created by the license document generator 26 and stored in the license database 23 (as field 47 of the product use authorization 35) can be of any content of this general format, as desired by the license issuer.

Instead of always selecting the rows in LURT tables according to the platform ID of the execution platform, in order to handle the breadth of business practices that need to be supported by the license management facility, the LURT mechanism is extended by providing a "row selector" attribute in the LURT class structure. No default is provided although it is expected that the normal value for the row selector attribute will be "platform ID."

In the system of U.S. Pat. No. 4,937,863, a concept similar to that of the LURT of FIG. 4 was provided, with rows selected by the platform ID and columns selected by some arbitrary means, typically according to product type. The system of this invention allows flexibility in the selection of both LURT row and column while continuing to provide backwards compatibility for licenses defined within the constraints of U.S. Pat. No. 4,937,863.

Some examples will illustrate potential uses for the row selector attribute. A customer may only want to pay for the use of a product during one or two months of the year; the product may be FORTRAN and the reason for this request may be that the company has a fairly stable set of FORTRAN subroutines that are given regular "annual maintenance" only during the months of May and June. To handle this customer's needs, the FORTRAN product would generate an application subcontext which would contain a value representing the month of the year. Then, a LURT table would be defined with twelve rows, one for each month of the year. In some column, probably column A, a negative one ($-1$) would be placed in each month except for May and June. These tow months would contain some positive number. The product use authorization would then have a LURDM field specifying a LURT for use to determine the units requirement, and would name this customer LURT table. The effect would be that the PUA could only be used during the months of May and June since negative one is interpreted by license managers to mean "use not authorized." This mechanism could also be used to do "time of day" charging. Perhaps charging fewer units per use at night than during the day. Also, if a subcontext was used that contained a year value, a type of license would be provided that varied in its unit requirements as time passed. For instance, it might start by costing 10-units per use in 1991 but then cost one unit less every year as time passed, eventually getting to the point where the unit requirement was zero.

Another example is font names. A specific customer may purchase a license giving it the right to concurrent use of 100units of a large font collection; some of the fonts may cost more to use than others. For instance, Times Roman might cost 10-units per use while New Century Schoolbook costs 20- units per use. The problem is, of course, making sure that charges are properly made. The solution is to build a LURT table with a specified application subcontext as its row selector. A row is then created for each font in the collection and in Column A of the LURT, the number of units required to pay for use of the font would be specified. The print server would then specify the name of a font as the value of the application subcontext whenever it does an lm_request_allocation ( ) call. This will allow charges to be varied according to font name.

A further example is memory size. Some products are more or less valuable depending on the size of memory available to support them. A software vendor wishing to determine unit requirements based on memory size will be able to do so by building LURT tables with rows for each reasonable increment of memory (probably 1-megabyte increments). Their applications would then sense memory size (using some mechanism not part of the license management facility) and pass a rounded memory size value to the license manager in a private context.

Other examples are environment and operating system. Some products may be valued differently depending on whether they are being run in an interactive mode or in batch. This can be accomplished by building LURT rows for each of the standard platform subcontexts that specify environment. Regarding operating system, it has been considered desirable by many to have a single product us authorization permit the use of a product on any number of operating systems, this conflicts with some vendors policies who do not want to have to create a single price for a product that applies to all operating systems. Thus, if an operating system independent license were offered for a C compiler, the price would be the same on MS-DOS, VMS, and/or UNIX. Clearly, it can be argued that the value of many products is, in part, dependent on the operating system that supports them. By using a row selector of operating system (one of the standard platform subcontexts), license designers could, in fact, require different numbers of units for each operating system. However, it might be more desirable to base the row selection on a private application subcontext that normally had the same value as the operating system subcontext. The reason for this is that the license designer might want to provide a default value for operating system names that were unknown at the time the LURT rows were defined. If this is the case, the product would contain a list of known operating systems and pass the subcontext value of "Unknown" when appropriate. The LURT row for "Unknown" would either contain a negative one (−1) to indicate that this operating system was unsupported or it would contain some default unit requirement.

Another example is variable pricing within a group. One of the problems with a "group" license is that there is only one unit requirements field on the PUA for a group. Thus, all members of the group share a single unit requirement. However, in those cases were all members of the group can be appropriately licenses with a constant unit requirement yet it is desired to charge different amounts for the use of each group member, a LURT can be build that has rows defined for each group member. The row selector for such a group would be the standard platform subcontext "product name."

Many different types of license can be created using different combinations of contexts, duration and policy from the table of FIG. 3. As examples, the following paragraphs show some traditional licensing styles which can be implemented using the appropriate values of the product use authorization fields 43-46.

A "system license" as it is traditionally designated is a license which allows unlimited use of a product on a single hardware system. The correct number of units must be allocated to the processor in advance and then an unlimited product use is available to users of the system. The product use authorization would have in the context field 44 a context template for a node name, the duration field would be "assignment" and the policy style field 43 would be "allocative".

A "concurrent use" license is one that limits the number of simultaneous uses of a licensed product. Concurrent use license units are only allocated when the product is being used and each simultaneous user of the licensed product requires their own units. In this case the context template, field 44, is a process ID, the duration field is "transaction" and the policy style 43 is "allocative".

A "personal use" license is one that limits the number of named users of a licensed product. This style of licensing guarantees the members of a list of users access to a product. Associated with a personal use type of product use authorization there is a list of registered users. The administrator is able to assign these users as required up to the limit imposed by the product use authorization; the number of units assigned to each user is indicated by the LURDM. It may be a constant or it may vary as specified in a LURT. The context template is "user name", the duration is "assignment", and the policy is "allocative".

A "site license" is one that limits the use of a licensed product to a physical site. Here the product use authorization contains for the context template either "network name" or "domain name", the duration is "assignment" and the policy style field 43 is "allocative".

Generally, a license to use a software product is prices according to how much benefit can be gained from using the product, which is related to the capacity of the machine it will run on. A license for unlimited use on a large platform such as a mainframe, where there could be thousands of potential users at terminals, would be priced at a high level. Here the style would be "allocative", the context template = "node", the duration = "assignment" and the LURDM may be "Column A"—the units, however, would be large, e.g., 1000. At the other end of the scale would be a license for use on a single personal computer, where the field values would be the same as for the mainframe except the units would be "1". If a customer wanted to make the product available on the mainframe but yet limit the cost, he could perhaps get a license that would allow only five users at any given time to use the product; here the fields in the product use authorization would be: units=5; style=allocative; context template=process; duration=transaction; LURDM=constant, 1,-unit. This would still be priced fairly high since a large number of users may actually use the product if a session of use was short. A lower price would probably be available for a personal use license where only five named persons could use the product, these being identified only in the license server 10, not named by the license issuer 25. Here the fields in the product use authorization are: units=5; style=allocative; context template=user name; duration=transaction; LURDM=-constant, 1-unit.

An additional feature that may be provided for in the product use authorization 35 is license combination. Where there are multiple authorizations for a product, license checking requests sent by user nodes 16 may be satisfied by combining units from multiple authorizations. Individual product use authorizations may prohibit combined use. Thus, a licensee may have a license to use a product 17 on an allocative basis for a certain number of units and on a consumptive basis for another number of units (this may be attractive from pricing standpoint); there might not be enough units available for a particular context from one of these licenses, so some units may be "borrowed" from the other license (product use authorization), in which case a combination is made.

Figure 5:
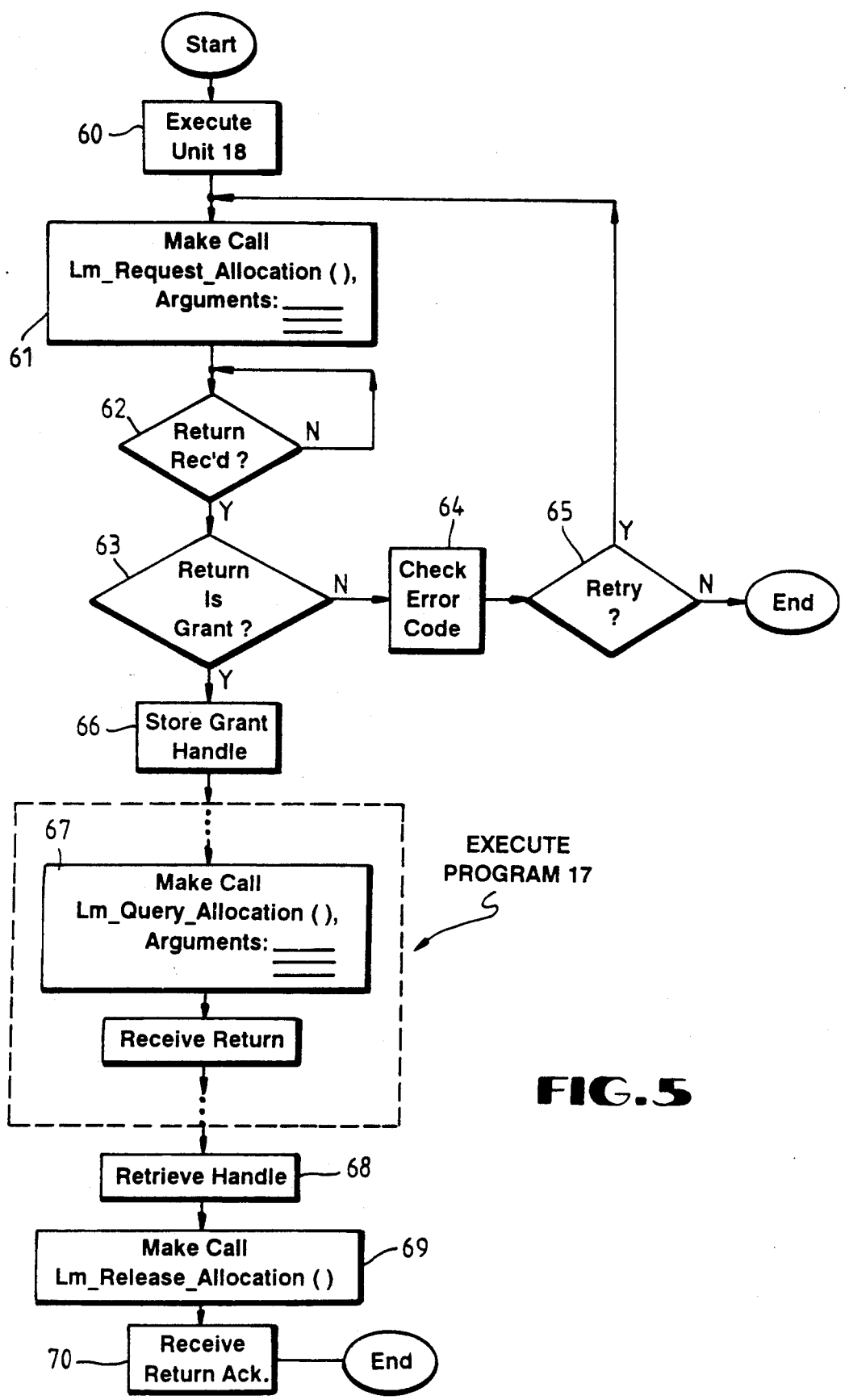
FIG. 5 is a logic flow charge of a program executed by a user node (client), in the system of FIG. 1, according to one embodiment of the invention.

The interface between the program executing on the client or user 16 and the license server 10 or its delegatees 13 includes basically three procedure calls: a request allocation, a release allocation and a query allocation. FIG. 5 illustrates in flow chart form some of the events occurring in this client interface. The request allocation is the basic license checking function, a procedure call invoked when a software product 17 is being instantiated, functioning to request an allocation of license units, with the return being a grant or refusal to grant. Note that a product may use request allocation calls at a number of points in executing a program, rather than only upon start-up; for example, a request allocation may be sent when making use of some particular feature such a special graphics package or the like. The release allocation call is invoked when the user no longer needs the allocation, e.g., the task is finished, and this return is often merely an acknowledge; if the style is consumptive, the caller has the opportunity via the release allocation call to influence the number of units consumed, e.g., decrease the number due to some event. The query allocation call is invoked by the user to obtain information about an existing allocation, or to obtain a calling card, as will be described.

The request allocation, referred to as lm13request13 allocation ( ), is a request that license units be allocated to the current context. This function returns a grant or denial status that can be used by the application programmer to decide whether to permit use of the product or product feature. The status is based on the existence of an appropriate product use authorization and any license management policies which may be associated with that product use authorization. License units will be allocated or consumed, if available, according to the policy statement found on the appropriate product use authorization. The product would normally call this function before use of a licensed product or product feature. The function will not cause the product's execution to be terminated should the request fail. The decision of what to do in case of failure to obtain allocation of license units is up to the programmer. The arguments in a request allocation call are the product name, producer name, version, release date, and request extension. The product name, producer name, version and release date are the name of the software product, name of producer, version number and release date for specifically identifying the product which the user is requesting an allocation be made. The request extension argument is an object describing extended attributes of the request, such as units required, LURT column, private context, and comment. The results sent back to the calling node are a return code, indicating whether the function succeeded and, if not, why not, and a grant handle, returned if the function completes successfully, giving an identifying handle for this grant so it can be referred to in a subsequent release allocation call or query allocation call, for example.

The release allocation, referred to as lm_release_allocation( ), is an indication from a user to the license manager to release or consume units previously allocated. This function releases an allocation grant made in response to a prior call to request allocation. Upon release, the license management style 38 determines whether the units should be returned to the pool of available units or consumed. If the caller had specified a request extension on the earlier call to request allocation which contained a units-required-attribute, and the number of units requested at that time are not the number of units that should be consumed for the completed operation, the caller should state with the units-consumed argument how many units should be consumed. The arguments of the release allocation are: grant handle, units consumed, and comment. The grant handle identifies the allocation grant created by a previous call to request allocation. The units-consumed argument identifies the number of units which should be consumed if the license policy is consumptive; this argument should only be used in combination with an earlier call to request allocation which specified a units requirement in a request extension. Omission of this argument indicates that the number of units to be consumed is the same as the number allocated previously. The comment argument is a comment which will be written to the log file 24 if release units are from a consumptive style license or if logging is enabled. The result is a return code indicating if the function succeeded, and, if not, why not.

The query allocation, or lm_query_allocation ( ), is used by licensed products which have received allocations by a previous request allocation call. The query is to obtain information from the server 10 or delegatee server 13 about the nature of the grant that has been made to the user and the license data used in making the grant, or to obtain a calling card (i.e., a request that a calling card by issued). Typically, the item rad by this query function is the token field 52 which contains arbitrary information encoded by the license issuer and which may be interpreted as required by the stub 19 for the licensed product software 17, usually when a "private" allocation style or context is being employed. The arguments in this procedure call are the grant handle, and the subject. The grant handle identifies the allocation grant created by a previous call to request allocation. The subject argument is either "product use authoriztion" or "calling card request"; if the former then the result will contain a public copy of the product us authorization. If this argument is a calling card request and a calling card which matches the previous constraints specified in that request can be made available, the result will contain a calling card. If the subject argument is omitted, the result will contain an instance of the allocation. The results of the query allocation call are (1) a return code, indicating whether the function succeeded, and, if not, why not, and (2) a result, which is either an allocation, a product use authorization or a calling card, depending on type and presence of the subject argument.

Referring to FIG. 5, the flow chart shows the actions at the client in its interface with the server. When the software product 17 is to be invoked, the unit 18 is first executed as indicated by the block 60, and the first action is to make a request allocation call via the stub 19, indicated by the block 61. The client waits for a return, indicated by the loop 62, and when a return is received it is checked to see if it is a grant, at decision block 63. If not, the error code in the return is checked at block 64, and if a return code indicates a retry is possible, block 65, control passes back to the beginning, but if no retry is to be made then execution is terminated. If the policy is to allow use of the product 17 without a license grant, this function is separately accounted for. If the decision point 63 indicates a grant was made, the grant handle is stored, block 66, for later reference. The program 17 is then entered for the main activities intended by the user. During this execution of product 17, or before or after, a query allocation call can be make, block 67, though this is optional and in most cases not needed. When execution of the program 17, or before or after, a query allocation call can be made, block 67, though this is optional and in most cases not needed. When execution of the program 17 is completed, the grant handle is retrieved, block 68, and a release allocation call is made, block 69. A loop 70 indicates waiting for the return from the server, and when the return received it is checked for an error code as before, and a retry may be appropriate. If the release is successfully acknowledged, the program exits.

Figure 6:
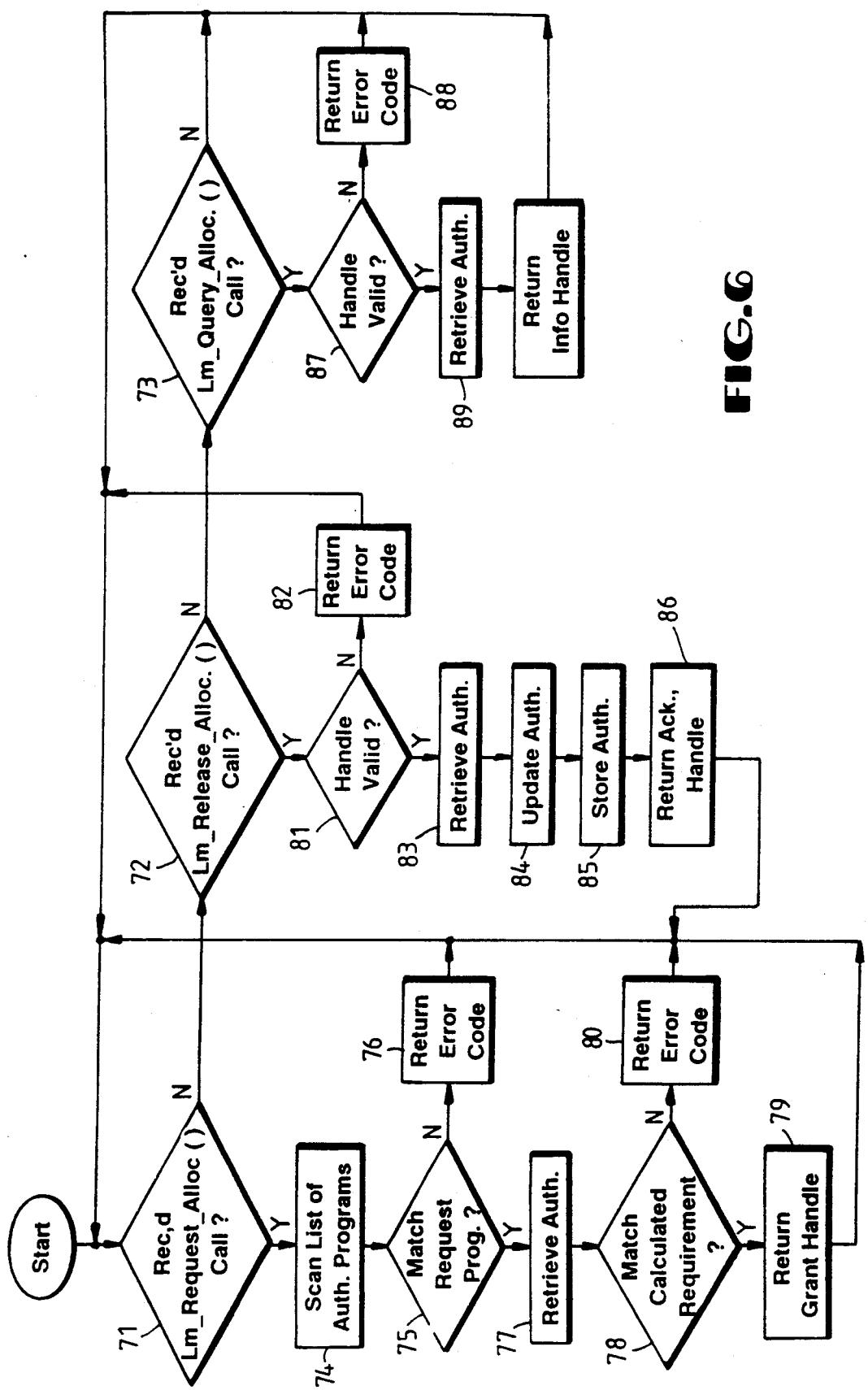
FIG. 6 is a logic flow chart of a program executed by a license server, in the system of FIG. 1, according to one embodiment of the invention.

Referring to FIG. 6, the actions of the server 10 or delegatee server 13 in executing the license management program 11 or 14, for the client interface, are illustrated in flow diagram form. A loop is shown where the server program is checking for receipt of a request, release or query call from its clients. The call would be a remote procedure call as discussed above, and would be a message communicated by a network, for example. This loop shows the decision blocks 71, 72 and 73. If a release allocation call is received, a list of products for which authorizations are stored is scanned, block 74, and compared to the product identity given in the argument of the received call, block 75. If there is not match, an error code is returned to the client, block 76, and control goes back to the initial loop. If the product is found, the authorization is retrieved from the database 23, block 77 (there may be more than one authorization for a given product, in which case all would be retrieved, but only one will be referred to here) and all of the information is matched and the calculations made depending upon the management policy of FIGS. 3 and 4, indicated by the decision block 78. If a grant can be made, it is returned as indicated at block 79, or if not an error code is returned, block 80. If a release allocation call is received, indicated by a positive at the decision block 72, the grant handle in the argument is checked for validity at block 81. If no match is found, an error code is returned, block 82, and control passes back to the initial loop. If the handle is valid, the authorization for this product is retrieved from the database 23 at block 83, and updated as indicated by the block 84. For example, if the license management style is allocative, the units are returned to the available pool. Or, in some cases, no update is needed. The authorization is stored again in the database, block 85, and a return made to the client, block 86, before control passes back to the initial loop. If the decision block 73 indicates that a query allocation call is received, again the grant handle is checked at block 87, and an error code returned at block 88 if not valid. If the grant handle matches, the authorization is retrieved from the database 23, at block 89, and a return is made to the client giving the requested information in the argument, block 90.

The basic allocation algorithm used in the embodiment of the license management system herein described, and implemented in the method of FIGS. 5 and 6, is very simple and can handle a very large proportion of known license unit allocation problems. However, it should be recognized that a more elaborate and expanded algorithm could be incorporated. Additions could be made in efforts to extend the allocation algorithm so that it would have specific support for optimizing unit allocation in a wider variety of situations. Particularly, sources of non-optimal allocations occurring when using the basic allocation algorithm are those that arise from combination and reservation handling.

The first step is formation of full context. The client stub 19 is responsible for collecting all specified platform and application subcontexts from the execution environment of the product 17 and forwarding these collected subcontexts to the license management server 13 or 10. The collection of subcontexts is referred to as the "full context" for a particular license unit allocation request.

The next step is retrieval of the context template. When the license manager receives an lm_request_allocation ( ), it will look in its list of available product use authorizations (PUA) to determine if any of them conform to the product identifier provided in the lm_request_allocation ( ) call. The product identifier is composed of: product name, producer, version, release date. If any match is found, the license manger will extract from the matching PUA the context template. This template is composed of a list of subcontexts that are relevant to the process of determining unit requirements. Thus, a context template may indicate that the node-ID subcontext of a specific full context is of interest for the purposes of unit allocation. The context template would not specify any specific value for the node-ID; rather, it simply says that node-ID should be used in making the allocation computation.

The next step is masking the full context. Having retrieved the context template, the license manger will then construct an "allocation context" by filtering the full context to remove all subcontexts which are not listed in the context template. This allocation context is the context to be used in determining allocation requirements.

Then follows the step of determining if the request is new. The license manager maintains for each product use authorization a dynamic table which includes the allocation contexts of all outstanding allocation for that PUA (i.e., allocations that have been granted but have not yet been released). Associated with each entry in this table is some bookkeeping information which records the number of units allocated, the full context, etc. To determine if a recent lm_request_allocation( ) requires an allocation of units to be made, the license manager compares the new allocation context with all those allocation contexts in the table of outstanding allocations and determines if an allocation has already been made to the allocation context. If the new allocation context does not already exist in the table, an attempt will be made to allocate the appropriate number of units depending on the values contained in the LURDM structure of the PUA and any LURTs that might be required. If an allocation context similar to that specified in the new allocation request does exist in the table, the license manager will verify that the number of units previously allocated are equal to or greater than the number of units which would need to be allocated to satisfy the new allocation request. If so, the license manager will return a grant handle to the application which indicates that the allocation has been made (i.e., it is a "shared allocation"- the allocated units are shared between two requests.) If not, the license manger will attempt to allocate a number of units equal to the difference between the number previously allocated and the number of units required.

The step of releasing allocations (FIG. 6, blocks 84-85) occurs when the license manager receives an lm_release_allocation ( ) call; it will remove the record in its dynamic allocation table that corresponds to the allocation to be released. Having doe this, the license manager will then determine if the allocation to be removed is being shared by any other allocation context. If so, the units associated with the allocation being released will not be released. They will remain allocated to the remaining allocation contexts. Some of the units might be released if the license manger determines that the number of allocated units exceeds the number needed to satisfy the outstanding allocation contexts. If this is the case, the license manger will "trim" the number of allocated units to an appropriate level.

In summary, the two things that make this algorithm work are (1) the basic rule that no more than one allocation will be made to any single allocation context, and (2) the use of the context template to make otherwise dissimilar full contexts appear to be similar for the purposes of allocation.

The license designer's task, when defining basic policy, is then to determine which contexts should appear to be the same to the license manager. If the license designer decides that all contexts on a single node should look the same (context template=node-ID), then any requests that come from that node will all share allocations. On the other hand, a decision that all contexts should be unique (i.e., context template=process-ID) will mean that allocations are never shared.

This mechanism permits the system of the invention to dispose of the cumbersome, explicit support of license types having different scope such as the cluster licenses, and process licenses found in prior license management systems including that of U.S. Pat. No. 4,937,863. Instead of defining a limited set of scopes (cluster, node, etc.), the system of this invention provides a general mechanism which allows an effectively unlimited range of allocation scopes to be defined.

Transitive licensing, as referred to above, is supported by the system of the invention by (1) calling authorizations, which are statements made in field 49 of the product use authorization 35 for one product (the "caller") to permit that product to call another product (the "callee"), and (2) caller authorizations, which are statements made in field 49 of the product use authorization for one product (the "callee") to permit it to be called by another product (the "caller").

If calling or caller authorizations are to be exploited by products, then whenever one product calls another product, it must pass the callee a calling card 49a. This calling card 49a is an encoding of an identification of the caller as well as a statement by the license management system that a license unit allocation has been made to the caller which is passing the calling card. This calling card is then passed by the callee to the license management system for validation and, if the either the product use authorization of the caller carries an appropriate calling authorization or the product use authorization of the callee carries an appropriate caller authorization, the use of the callee by the caller will be authorized without requiring any additional license unit allocations.

Figure 7:
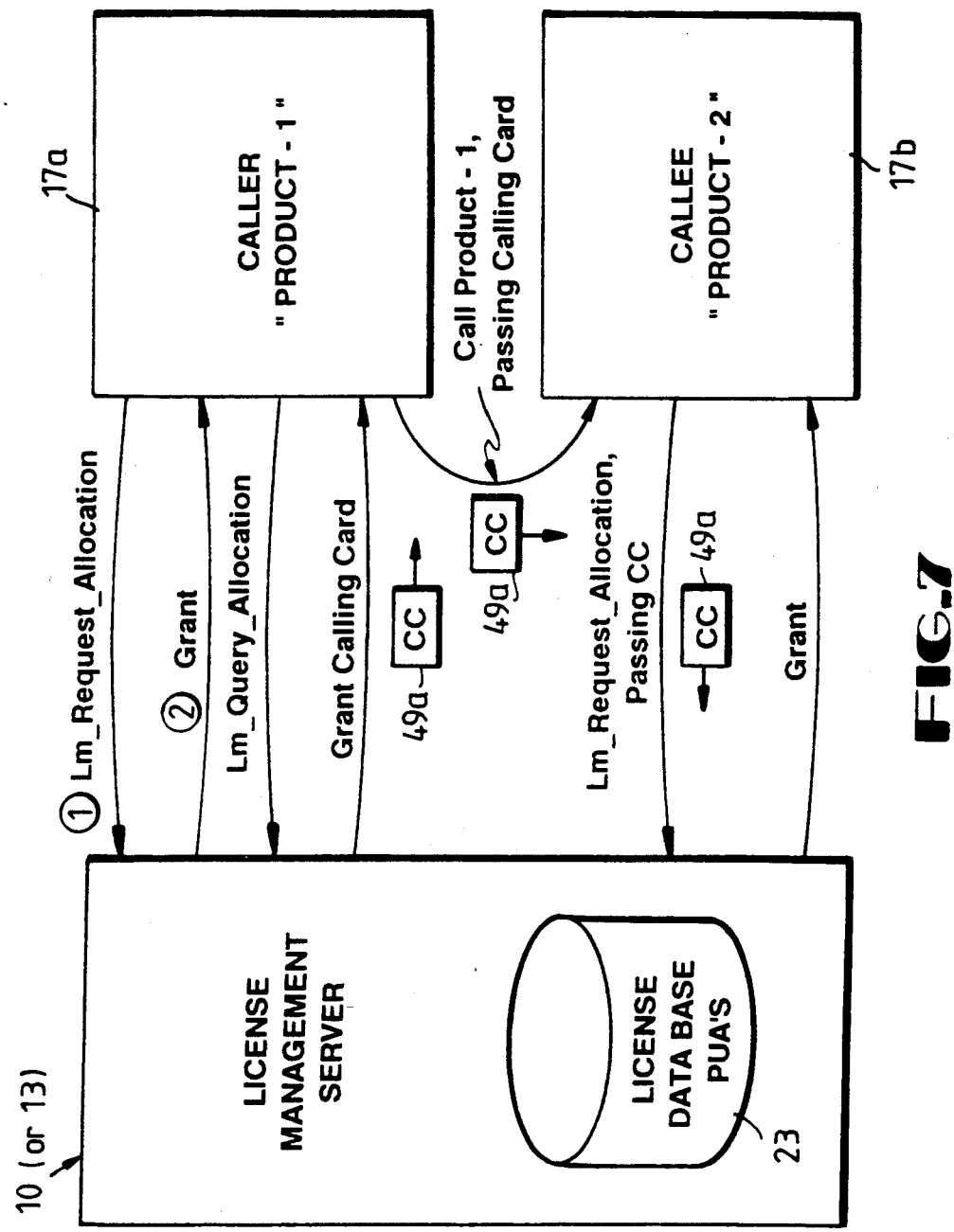
FIG. 7 is a diagram of the calls and returns made in an example of use of calling cards in the system of FIG. 1.

Referring to FIG. 7, the intercomponent interactions that occur when either calling or caller authorizations are being used are illustrated. This figure shows a license management server 10, a caller product 17a named "Product-1" and a callee product 17b named "Product-2". When Product-1 starts to run, it will make an lm_request_allocation ( ) call to the license management server 10 to obtain a grant handle for an allocation of some number of units of the Product-1 license. Either immediately, or at some later time, but always prior to making a call to Product-2, Product-1 will call lm_query_allocation ( ), passing the grant handle received earlier and specifying that it wants a calling card for the product named "Product-2." If the field 49 of the product use authorization 35 used to satisfy the grant represented by the grant handle carries a calling authorization in field 49 naming "Product-2," the license manager will create a calling card 49a which includes the statement that a calling authorization exists and pass this calling card back to Product-1. If the calling authorization does not exist, the calling card passed to Product-1 will contain a statement to that effect.

Once Product-1 has successfully obtained a calling card 49a from the license manger, it will then make a call to Product-2, passing the calling card along with any other initialization parameters that would normally be used when starting Product-2. Product-2 will then pass that calling card to the license manger as part of its lm_request_allocation( ) call and the license manager will determine if the calling card is valid. Note that calling cards become invalid once the process which received the calling card makes an lm_release_allocation( ) call or terminates abnormally. If the calling card is valid, and it indicates that a calling authorization is present, the license manager will verify this statement and if found to be true, will return a grant handle to Product-2. If, on the other hand, the calling card carries an indication that no calling authorization is present, the license manager will attempt to find a product use authorization for Product-2 that contains a caller authorization naming Product-1 as an authorized caller. If the caller authorization is found, a grant handle will be passed back to Product-2. If not, the license manager will ignore the calling card and proceed with the normal lm_request_allocation( ) logic.

The requirement to be passing calling cards between products requires that both the caller and the callee be "aware" of the fact that calling and caller authorizations may be used. This is one of the few examples of a requirement for a product 17 to become actively involved in the licensing problem when using the licensing management system of the invention. However, since the use of calling/caller authorizations if a fairly "sophisticated" and powerful feature, it is considered acceptable to impose this burden on application coders.

MANAGEMENT INTERFACE

Referring to FIG. 1, the license management program 11 executing on a server 10 includes a license management interface 33 which functions to allow a user at a console for the server 10 CPU or at a remote terminal to implement certain necessary operations. The management interface 33 is essentially the tools or mechanisms available to the license manager at the licensee's site to (a) load the various licenses received from issuers 25 into the database 23 and make them available for request allocation calls from the users, (b) remove the licenses from the machine when expired, (c) to make delegations if permitted, (d) to make assignments, (e) to make reservations, etc. Whatever the license manager is allowed to do to modify the license for his special circumstances (within the original grant, of course), he does it by the mechanism of the management interface 33. Some licenses are not modified at all, but merely loaded. In a multiple machine environment, as on a network, there is considerable modification, as it is necessary to make sure the correct number of units are distributed onto the correct machines, the right people have access, other people don't have access, etc. Thus, in a network environment, there is extensive use of the management interface 33.

In reference to the terminology used in describing the management interface, as well as the license management system in general, it is helpful to note that the documentation conventions, data declarations, macro declarations, etc., for the object management used in one embodiment of the invention are according to the standards set forth in OSI Object Management API Specification, Version 2.0, X.400 API Association and X/Open Company Limited, 24 Aug. 1990, a published document.

The specific operations available to the management interface 33 are to allow a manager to open and close a management session, register (load) objects in the license database 23, obtain a list of objects in the license database 23, and control a cursor (a cursor is a movable pointer to a member of a list of items). Once an object in the license database 23 is identified with the cursor, certain changes may be made in the object by a write function. For example, certain fields of a license document of FIG. 2 or an LURT of FIG. 4 may be changed in only specified ways as will be explained.

The operation of opening a session goes by the name of lm_open_session( ) and is used to establish a license management service session between a management client and the service. Opening a session also creates a workspace to contain objects returned as a result of functions invoked within the session. Object management Objects can be created and manipulated within this workspace. Objects created within this workspace, and only such objects, may be used as Object arguments to the other license management service management functions used during the session established by a call to this function. More than one session may exist simultaneously.

The arguments that go with a lm_open_session( ) call are (a) the binding handle, which is binding information that defines one possible binding (a client-server relationship), and (b) a comment which will be inserted in the log file 24 if logging is enabled. The results from a lm_open_session( ) call are (a) a return code indicating whether the function succeeded, and, if not, why not, (b) a session, which is an established license management session between the management client and the license management service, and (c) a workspace that will contain all objects returned as a result of functions invoked in the session.

The close session call is referred to by lm_close_session( ) and functions to terminate the lm session. This function terminates the license service management session and makes the argument unavailable for use with other interface functions. The arguments that go with a lm_close_session( ) call are (a) the session which identifies the established lm session between the management client and the license management service, and (b) a comment which will be inserted in the log file if logging is enabled. The result of the call is a return code indicating whether the function succeeded, and, if not, why not.

The list function returns a set of selected objects in the license database 23, and uses the name lm_list_licenses( ). This function is used to search the license database 23 and return a cursor which represents the first of one or more objects which match the specified filter. The specified filter will be applied to each object in the license database 23; al objects for which the filter evaluates true will be included in the object list accessible by the set_cursor function. The arguments that go with lm_list_licenses( ) are (a) session which identifies an established session between the management client and the license management service, and (b) a filter which is an object used to select license database 23 objects; license database objects will only be included in the object list headed by the cursor if they satisfy the filter—the constant no-filter may be used as the value of this argument if all license data objects are to be included in the object list. The results of the lm_list_licenses( ) call are (a) a return code indicating whether the function succeeded, and, if not, why not, and (b) a license list upon successful completion of this call containing a cursor which represents the first of one or more objects in the current license database 23 for which the specified filter evaluates true.

The register function is to register objects in the license database 23, and uses the name lm_register( ). This function is used to register (i.e., load or create) new objects, or modify existing objects, in the license database 23; the objects which may be registered include only those which are subclasses of the license data class or history objects. The arguments are (a) session, which identifies an established session between the management client and the license management service, (b) license data object which is to be registered; if this argument is omitted, the comment argument is a required argument and a history object containing the comment will be registered in the license database 23, and (c) comment, which will be inserted in the log file if logging is enabled. The result is a return code indicating whether the function succeeded, and, if not, why not. The errors possible when it does not succeed include data-expired, duplicate-object, no-such-session, memory-insufficient, network-error, etc., indicated by this return code.

The set cursor function establishes a new cursor, and is called by lm_set_cursor( ). The arguments are (a) session, which identifies an established session between the management client and the license management service, (b) forward, which is a boolean value indication if the direction in which the cursor is to be moved is forward or reverse, (c) filter which is used to eliminate cursors from the search for the next cursor that are not wanted; a new cursor will only be set if it satisfies the filter—the constant no-filter may be used as the value of this argument if any cursor is to be considered as the target cursor, and (d) the cursor which is to be used as the starting point in searching for the new cursor. The results are (a) a return code indicating whether the function succeeded, and, if not, why not, and (b) next-cursor, which is the requested cursor. The error codes in the return code may be end-of-list, not-a-cursor, etc.

After a session is opened, and an object such as a product use authorization or a LURT has been identified by the cursor, using the functions explained above, the management interface 33 is able to execute certain object management interface functions such as write or copy. By this mechanism, the management interface can modify certain limited attributes. None of these attributes can be modified in such a way that they reduce constraints established by corresponding attributes in the license data objects. The more important attributes which can be modified by the management interface 33 using this mechanism are:

(a) assignment: an assignment of some or all of the units granted on the associated product use authorization;

(b) reservation: a reservation of some or al of the units granted on the associated product use authorization;

(c) delegation: a delegation of the right to manage some or all of the units granted on the associated product use authorization, or if the associated license data is not a product use authorization, the delegation is of the right to use that license data;

(d) backup delegation: a statement of the right to manage some or all or the units granted on the associated product use authorization; this right is only active at times when the delegating server is not available;

(e) allocation: an allocation of units to a specific context;

(f) allocation period: the minimum duration of a single allocation—all allocated units cannot be allocated to a new context until a time period equal to the allocation period has passed since the units were last allocated;

(g) termination date: a date which is to override the value specified as the end date of the product use authorization 40—this date must be earlier than specified;

(h) delegation permitted: an override of the delegation permitted flag of the associated license data;

(i) overdraft: the current overdraft level;

(j) overdraft logging: an override of the overdraft logging attribute of the associated product use authorization;

(k) comment: a comment created by the licensee;

(l) extended info: information not defined by the architecture which may be of use in managing the license data.

It will be noted that an assignment and a reservation are identical, the only difference being that a reservation is something optional, while an assignment is something that is required. If the duration if Assignment in the policy declaration of FIG. 3, the license manager must assign some or all of the units before units can be allocated. Reservations, on the other hand, are made by the license manager using the management interface, regardless of the policy.

Thus, there are certain attributes that can be changed by a license administrator using the management interface at the server 10, but none of these can result in obtaining more extensive rights to use than granted by the product use authorization. In each case, the license administrator can limit the rights which will be allocated to users in some way that may be appropriate for the administrator for control purposes.

LICENSE DOCUMENT INTERCHANGE FORMAT

The major structural components of an ASN.1 encoded document which confirms to the specifications for the license management system discussed above will be described. The object identifier that is assigned to this data syntax, according to one embodiment, is that specified in ASN.1 as seen in FIG. 8. The International Standards Organization or ISO, as it is referred to, defines how bit patterns are chosen to uniquely identify an object type, so the bit pattern set forth in FIG. 8 would preceed each document used in the license management system so the document could be identified as being a document conforming to the prescribed License Document Interchange Format.

A document encoded according to this format is represented by a value of a complex data type called "license document interchange format document" of LDIFDocument, in this embodiment. A value of this data type represents a single document. This self-describing data structure is of the syntax defined in the international standard ASN.1 referred to above. The X/Open standard referred to above defines the conventions that must be used in employing this syntax, while the syntax itself is described in an OSI (Open Systems Interconnect, a standard administered by ISO) document identified as X.409 (referenced in the X/Open document identified herein).

The LDIFDocument data type consists of an ordered sequence of three elements: the document descriptor, the document header, and the document itself. Each of these elements are in turn composed of other elements. The overall structure of the LDIFDocument data type will be described, and the nature of the document descriptor and document header types. Then, the document content elements will be described in detail, as well as the various component data types used in the definition of the descriptor, the header and the content.

The LDIFDocument represents a single license document, with the syntax being shown in FIG. 9 and the high-level structure of an LDIF document in graphical form being seen in FIG. 10. The DocumentDescriptor of FIG. 9 is a description of the document encoding, the DocumentHeader contains parameters and processing instructions that apply to the document as a whole, and the DocumentContent is the content of the document, all as explained below.

Referring to FIG. 9, what this says is that an LDIF-Document is composed of ( =means "is composed of") a number of elements, the first thing in an LDIF-Document is a bit pattern (tag) according to an international standard, indicating a certain type of document follows, which is indicated here to be "private" or vendor selected, the number 16373 in this case. Following the bit pattern which functions as a "starting delimiter" it is "implicit" that a "sequence" of elements must follow, where a sequence is distinguished from a set. A sequence is one or more of the elements to follow, whereas a set is exactly one of the elements to be listed. Implicit means that any file identified as LDIFDocument must have a sequence data type, rather than some other type. In the case of FIG. 9, the sequence is document-descriptor, document header and document content; the document-content is mandatory, whereas the first two are optional. If an element in the sequence begins with a "0" it is a document-descriptor, "1" means a document-header, and "2" means it is a document-content. Again, it is implicit that the data following is of the format DocumentDescriptor, etc., in each case, and these are defined in FIG. 11, FIG. 13 and FIG. 15.

Each file is in the tag-length-value format mentioned above, and also each element of a file containing multiple elements is of the tag-length-value format. The data stream could be examined beginning at any point, and its content determined by first looking for a tag, which will tell what data structure this is, then a length field will say how long it is, then the content will appear. These structures are nested within one another; a document containing several product-use-authorizations would be an LDIFDocument of the format of FIG. 9, with a number of DocumentContent elements of FIG. 15 following, with the length given for the LDIFDocument spanning the several PUAs, and the length given for each PUA being for the one PUA.

In FIG. 11, the elements major-version and minor-version are seen to be "implicit integer". This means that because the element is of the type major-version, etc., it must be an integer. Various other implicit types are given in other syntax diagrams, such as character-string, boolean, etc.

In FIG. 15, the license body is identified as being of the type "choice" meaning it can be one of PUA, LURT, GroupDefinition, KeyRegistration, etc. Thus, knowing this is a license-body does not means the data type of the object is known; it is a bit further where the kind of a license-body becomes known. The definition of a license body is not implicit, but instead is a choice type.

The contents of the various data elements will now be described in detail with reference to FIGS. 11-43. Using these detailed descriptions, the exact format of each of the elements used in the LDIF can be interpreted.

The license document descriptor or DocumentDescriptor consists of an ordered sequence of four elements which specify the version level of the LDIF encoding and identity the software that encoded the document, with the syntax being shown in FIG. 11. An example of the way a product called PAKGEN V1.0 is expressed in the DocumentDescriptor encoding is shown in FIG. 12. The fields in the DocumentDescriptor syntax are major-version, minor-version, encoder-identifier and encoder-name. The major-version field is the primary indicator of compatibility between LDIF processors and the encoding of the present document; this major-version field is updated if changes are made to the system encoding that are not backward compatible. The minor-version field is the revision number of the system encoding. The encoder-identifier field is a registered facility mnemonic representing the software that encoded the document; the encoder-identifier can be an acronym or abbreviation for the encoder name—this identifier is constant across versions of the encoder. The encoder-identifier should be used as a prefix to Named Value Tags in Named Value Lists to identify the encoder of the named value. The encoder-name field is the name of the product that encoded the document; the encoder-name string must contain the version number of the product.

The document header or DocumentHeader contains data that pertains to the document as a whole, describing the document to processors that receive it; the syntax is shown in FIG. 13. An example of a document header is shown in FIG. 14, using the hypothetical product PAKGEN V1.0 of FIG. 12. The private-header-data contains the global information about the document that is not currently standardized; all interpretations of this information are subject only to private agreements between parties concerned, so a processor which does not understand private header data may ignore that data. The Title field is the user-visible name of the document. The Author field is the name of the person or persons responsible for the information content of the document. The Version field is the character string used to distinguish this version of the document from all other versions. The Date filed is the date associated with this document. Note that the nature and significance of the Title, Author, Version, and Date fields can vary between processing systems.

The content of an LDIF document is represented by a value of a complex data type called DocumentContent. An element of this type contains one or more LicenseData content element using a syntax as shown in FIG. 15. There are no restrictions on the number, ordering or context of LicenseData elements. The structure of a LicenseData element is represented in FIG. 16. No restrictions are made on the number, ordering, or context of LicenseData elements. The license-data-header field of FIG. 16 specifies that data, common to all types of license date, which describes the parties to the licensing agreement, the term of the agreement, and any constraints that may have been placed on the management of the license data encoded in the license body. The license-body is an element that contains one content element, including: product use authorizations, license unit requirements tables, group definitions, key registrations, and various forms of delegations. The Management-Info is an element that contains information concerning the current state of the license data; this element is not encoded by Issuers.

The license data header, called LicenseDataHeader, is represented as a syntax diagram in FIG. 17. The license-id field provides a potentially unique identification of the encoded license data, so issuers of license data can generate unique license-ids to distinguish each issuance of license data; however, the architecture does not require this to be the case, since the only architectural restriction is that no two objects in any single license management domain may have the same value for license-id. The licensee field identifies the party who has received the rights reflected in the license data; there are at least two parties involved in all transfers of license date, first, the issuer of the license date, and second, the licensee or recipient of that data—it is anticipated that individual licensees will specify to those issuing them licenses what the licenses fields on their license data should contain. the term field identifies that term during which the license data may be used; the validity of license data can be limited by issuers to specific time ranges with given starting and ending dates, which are carried in the term element—attempts to use license data or products described by that data either before the start date or after the end date will result in conforming license managers denying access to the license. Management-constraints identifies constraints placed on the right to manage the associated license data; these constraints can include (a) limiting the set of contexts permitted to manage the data, (b) limiting the set of platforms which may benefit from that management, and (c) limiting the right to backup and delegate the managed data. The signature provides the digital signature used by the issuer to sign the license data and identifies the algorithm used in encoding the signature. Issuer-comment is a comment provided by the issuer and associated with the license data.

The IssuerComment is of an informational nature and does not impact the process of authorizing product or feature use. This field is not included in the fields used to generate the signature for a license, thus, even if specified by an issuer, the IssuerComment can be omitted from a license without invalidating the license. If specified, the IssuerComment should be stored in the appropriate license data base with the associated license data. The IssuerComment can be retrieved by products which use the system and may be of particular utility to products in the "Software Asset Managment" domain which are intended to extend or augment the administrative or accounting facilities or basic system components. Some examples of potential uses for this field are order information, addition terms and conditions, and support information. For order information, some issuers may wish to include with their loadable license data some indication of the purchase order or orders which caused the license data to be issued; licensees may find it useful to include this data in their license databases to assist in the license management process. For additional terms and conditions, the system will never provide automatic means for the management of all possible license terms and conditions, and so some issuers may wish to include summaries of non-system managed terms and conditions in the comment as a reminder. For support information, the IssuerComment could be used to record the phone numbers or addresses of the responsible individuals within the issuing organization who should be contacted if there are problems with the data as issued.

A product use authorization as previously discussed in reference to FIG. 2 is used to express the issuance of a right to use some product, product feature, or members of some product group. As such, it records the identity of the product for which use is authorized and specifies the means that will be used by the license manager to ensure that the licensee's actual use conforms to the terms and conditions of the license. FIG. 18 illustrates a syntax diagram for a ProductUseAuthorization. Product-id identifies the name of the producer of the product or product feature of which usage rights are being granted as well as the name of that product; in addition, issuers of product use authorizations may specify a range of versions and/or releases whose use is controlled by the specific product use authorization. Units-granted—Contains the number of units of product use which are granted by the license. Management-policy defines the policy which is to be used in managing the granted software usage rights; this definition specifies the Style, Context-Template, Duration, and License Unit Requirements Determination Method which must be used. The calling-authorizations and caller-authorizations are as explained above in reference to calling cards. The execution-constraints field identifies constraints placed on the characteristics of execution contexts which may be authorized to benefit from the units granted by this Product Use Authorization. The product-token filed contains product specific data not interpreted in any way by any processors conformant with the architecture; software product producers 28 use this array to augment the capabilities of conformant license managers.

Some anticipated uses of the token field include language support, detailed feature authorizations, and product support number. For language support, a token could be constructed which contains a list of local language interface versions whose use is authorized; thus, if a product were available in English, German, French and Spanish, a token could be constructed listing only English and German as the authorized languages. For detailed feature authorizations, some license issuers will wish to have very fine control over the use of features in a complex product; however, they may not wish to issue a large number of individual Product Use Authorizations to "turn on" each feature, so these vendors could construct tokens which contain lists of the features authorized or whose use is denied. For product support number, some issuers may wish to include on the product use authorization, and thus make available to the running product, some information concerning the support procedures for the product; for example, an issuer might include the telephone number of the support center or a support contract number, and the product could be designed to retrieve this data from the license manager and display it as part of Help dialogues.

The LURT's or license use requirements tables of FIG. 4 provide a means by which issuers of licenses, whose LURDM is dependent on the type of platform on which the product is run, can store information describing the relationship between the platform type and unit requirements. A syntax diagram for a LURT is shown in FIG. 19. In FIG. 20, an example of how the LURT of FIG. 4 might be encoded is illustrated. Lurtname specifies the name by which the LURT is to be known to conforming license mangers. The rows field models a list of multicolumn lurt rows. Platform-id identifies the platform for which this LurtRow provides license unit requirements. The lurt-columns field provides a list of one or more lurt column values; the first value provided is assigned to column-1 of the lurt-row, the second value provided is assigned to column-,etc. A lurt column value of $-1$ indicates that use of the product or feature is not authorized, while a lurt column value of 0 or greater indicates the number of units that must be allocated in order to authorize product use on the platform described by this lurt-row. All unspecified columns (e.g., columns whose number is greater than the number of column values provided in the lurt columns element) will be considered to contain the value $-1$.

In reference to FIG. 19, to use the row-selector feature mentioned above, the platform-ID element would be replaced with row-selector which would be implicit of Context. Also, in FIG. 34 described below, in the lurdm-kind element, row-selector would be included if the row-select feature is to be used.

As discussed above, FIG. 4 provides an example of a hypothetical LURT, illustrating the LURT mechanism, where the issuer of this LURT table has established three unit requirement tiers for use in determining the unit requirements for that issuer's products. FIG. 20 provided an example of how the LURT presented in FIG. 4 might be encoded.

A group definition is used to define and name a license group. Once so defined, the name of this group can be used on product use authorizations in the same manner as a product name. Since a single product use authorization specifies the management policy for all members of the group, the members of that group must be compatible in their licensing styles, ie., a personal use type product can not be mixed with a concurrent use product in the same group. FIG. 21 shows a group definition syntax diagram. Group-name is the name which must appear on Product Use Authorizations for this group. Group-version specifies the current version of this group; the requirements for matching between the version information on a product use authorization and that on a specified group definition are the same as those rules which require matching between produce use authorizations and the Release Date data provided by products. Group-members lists those products or features which are components of the named group.

A key registration is used by a producer 28 or issuer 25 who have been registered as authorized license issuers and provided with an appropriate public and private key pair. The key registration identifies the public key which is to be used by conforming license managers 10 in evaluating signatures 53 created by named issuer 25 or producer 28. A key registration syntax diagram is shown in FIG. 22. Key-owner-name provides the name which must be used in either of, or both, of the Producer and Issuer fields of license data generated by the issuer; the key-owner-name must be identical to that specified in the Issuer field of the header record. Key-algorithm identifies the registered algorithm that is to be used when producing digital signatures with this key. Key-value identifies the public key.

An issuer delegation is typically issued by a producer 28 and authorizes the named issuer 25 to issue licenses for products produced by the producer. An issuer delegation syntax diagram is shown in FIG. 23. Delegated-issuer-name identifies the name which must appear in the Issuer field of any Product Use Authorization generated using the License Issuer Delegation. Delegated-product-id identifies the products whose licenses the names issuer is authorized to issue. Delegated-units-granted, if specified, indicates that the use of this Issuer-Delegation is to be managed in the style of a consumptive license; the value of this attribute gives the number of units for which license documents may be generated (i.e., if granted 1000 units by a Producer, an Issuer can only issue 1000 units.) Template-authorization provides a "template" Product Use Authorization whose attribute values must be included on any Product Use Authorization generated using this IssuerDelegation; in the case of attributes which have a scalar value (i.e., Version, Release Date, etc.), the Issuer may issue licenses with more restrictive values than those specified on the Template Authorization. Sub-license-permitted indicates whether the Issuer identified on this IssuerDelegation may issue an Issuer Delegation for the delegated-product-id.

A license delegation, as shown in a syntax diagram of FIG. 24, is used to delegate the right to manager license data. Such delegations are created by the licensee (by the license manager), if authorized by the issuer 28. A backup delegation, also shown in FIG. 24, is used by one license management facility to authorize another to manage the delegated rights in the case that the delegating license manager is not running. The delegated-units field specifies the number of units whose management is being delegated; this may only be specified when a product use authorization is being delegated. Delegation-distribution-control defines the mechanism by which he distribution and refreshing of the delegation will be accomplished. Delegatee-execution-constraints identifies any constraints which are placed on the execution-context of the Delgatee; these constraints are applied in addition to those which are a part of the delegated License Data. Assignment-list identifies any assignments of the delegated units that must be respected by the delegatee. Delegated-data stores a copy of the LicenseData received from he issuer that is the subject of the delegation; the delegated data is not provided when the LicenseDelegation element is included in a DelegationList.

The management information or ManagementInfo element records information concerning the current state of the LicenseData with which it is associated. A syntax diagram of the ManagementInfo element is shown in FIG. 25. The assignments field identifies a list of one or more assignments which may be outstanding for the units on the associated product use authorization. Reservations identifies a list of one or more reservations which may be outstanding for the units on the associated product use authorization. Delegations identifies a list of all outstanding delegations. Backup-delegations identifies all outstanding backup delegations. the allocations field provides detailed information about outstanding allocations which involve units from the associated product use authorization. Registration-date is the date on which the LicenseData was registered in the license database. Registrar is the context which caused the LicenseData to be registered. Local-comment is a comment field. Termination-date means a license defined date after which the license data may not be used; this date must be earlier than the end-date specified in the license data's term record. The extended-info field allows additional information concerning the state of the LicenseData and its handling by the license manager that is not standardized.

The defined types of elements will now be described. These defined type are:

| | |
|---|---|
| Allocation | ManagementPolicy |
| Assignment | Member |
| Context | NamedValue |
| DistributionControl | NamedValueList |
| ExecutionConstraints | ProductID |
| IntervalTime | Signature |
| LicenseID | Term |
| LUDRM | Version |
| ManagementConstraints | |

The allocation element records the information concerning a single unit allocation, and is shown in a syntax diagram in FIG. 26. Allocation-context specifies the context to which the allocation was made. The allocation-lur field specifies the license unit requirement which applies to the allocation-context; this license unit requirement is calculated without consideration of any allocation sharing which may be possible. The allocation-group-id field identifies the "allocation-group" for the current allocation, in which an unshared allocation will always have an allocation group id of 0; allocations which utilize shared units will have an allocation group id which is shared by all other allocations sharing the same units.

The assignment element is shown in syntax diagram in FIG. 27. Assigned-units identifies the number of units which are assigned. Assignment-term identifies the start and end of the assignment period. Assignee identifies the context to which he assignment is made.

The context element is shown in syntax diagram in FIG. 28. The SubContext-type field identifies the type of subcontext, and this type can be either standard or private; if standard, the type value will be taken from the standard-subcontext-type enumeration: (a) network-subcontext means the subcontext value identifies a network; (b) execution-domain-subcontext means the subcontext value is the name of the management domain within which the caller is executing; (d) login-domain-subcontext means the subcontext value is the name of the management domain within which he user of the caller was originally authenticated or "logged in"; (d) node-subcontext means the subcontext value is the name of a node; (e) process-family-subcontext means the subcontext value is an implementation specific identifier for a group of related processes; (f) process-ID-subcontext means the subcontext value is an implementation specific process identifier; (g) user-name-subcontext means the subcontext value is a user name; (h) product-name-subcontext means the subcontext value is the same as the product name found on the Product Use Authorization; (i) operating-system-subcontext means the subcontext value is a character string representation of the name of the operating system; (j) platform-ID-subcontext means the subcontext value is an identifier that describes the hardware platform supporting the context. The subcontext-value field is the value of the subcontext.

As discussed above, license data is always used or allocated within, or for the benefit of, some named licensing context. This context name is constructed by concatenating the values of all subcontexts into a single context name. A Context Template specifies those components of the context name which should be used in calculating license unit requirements. The management system determines the need to perform a unit allocation each time license units are requested. The full context on whose behalf the allocation should be made is obtained for each requested authorization. The system will mask the full context to exclude all sub-contexts not specified in the context template and then determine if the resulting context already has units allocated to it. If not, units will be allocated according to the specification of the LURDM, otherwise, the units previously allocated will be shared by the new context. Thus, if a given product authorization contains a context specification of NODE+USER_NAME, each context which requests license unit allocations and which has a unique pair of NODE+USER_NAME subcontext values will require an explicit grant of license units to be made. On the other hand, any contexts which share the same pair of NODE and USER_NAME subcontext values will be able to "share" a single allocation of license units. The requirement for specific allocations of units and the ability to share units is exhibited in FIG. 29 which attempts to provide a "snapshot" of the units allocated for the product FOOBAR V4.1 at a particular instance. It is seen from the figure that although presented with five unique full contexts, only four of them are unique when looking only at those portions of each context which are described by the Context Template (i.e: NODE+USER_NAME). A unit allocation must be made for each of the four instances of unique contexts, when masked by the Context Template. The fifth context can share allocated units with another context. Thus, the total requirement to support product use as described in this example would be 40-units (ie: four allocations of ten units each). Significant changes in the unit requirements can be achieved by making small modifications to the Context Template. FIG. 30 shows the same contexts as in FIG. 29 but a Context_Template of NODE. The total unit requirement for this example would be three units (three allocations of ten units each) rather than the forty units required in the previous example.

The distribution control element defines the mechanism that will be used for distributing the subject delegation and records some status information concerning the distribution of that delegation. A syntax diagram of the distribution control element is shown in FIG. 31. Distribution-method identifies the means by which the delegation will be distributed, and the alternatives are refresh-distribution, initial=distribution-only, and manual-distribution. Refresh-distribution means the license manager shall be responsible for the initial distribution of the delegation and for ensuring that refresh delegations are properly distributed. Initial-distribution-only means the license manager shall be responsible for the initial distribution of the delegation, however, distribution of refresh delegations will be made by some other means. Manual-distribution means the distribution of the delegation will be under the control of some other mechanism (perhaps a license asset manager). Current-start-date is the time that the last successful initial or refresh delegation distribution was performed. Current-end-date identifies the last date on which the most recent delegation distribution was performed. Refresh-interval identifies the period of time between attempts to refresh the delegation; the refresh-interval may not be longer than the maximum-delegation-period and should normally be less than that in order to ensure that refresh delegations are distributed prior to the expiration of the previous delegations that they are replacing. Retry-interval identifies the amount of time to wait for an unsuccessful distribution attempt to try again. Maximum-retry-count identifes the maximum number of times that an unsuccessful distribution attempt may be retried. Retries-attempted records the number of unsuccessful retry attempts which have been made since the last successful initial or refresh delegation distribution was performed.

The execution constraints elements place limits on the environments and contexts which may receive allocations. A syntax diagram of the execution constraints element is shown in FIG. 32. Operating-system contains a list of zero or more operating systems on which the use of the subject license is authorized; if no operating systems are specified, it is assumed that license use is authorized on all operating systems. Execution-context specifies a list of zero or more full or partial context names which identify the contexts within which products described by the license data may be executed; if no context names are specified, the licensed products may be executed in any context controlled by the licensee. Environment-list identifies those environments within which the licensed product may be used.

The interval time element is defined by the syntax IntervalTime =UTCTime.

The license ID element uniquely identifies the license data it is associated with, and is described by the syntax diagram of FIG. 33. Here issuer uniquely identifies the issuer of the license data as well as the name space within which the LicenseID Number is maintained. While the issuer name will typically be the same as the name of the issuer's company or personal name, this is not a requirement. For instance: The issuer name for Digital Equipment Corporation is "DEC," an abbreviation of the corporate name. Valid contents of the Issuer field are maintained in the an Issuer Registry. The serial-number provides a unique identification or serial number for the license data. The amendment field is an integer which is incremented each time license data is amended by its issuer, with the first version of any license data carries the amendment number 0; an amendment can only be applied to license data if that license data has identical Issuer and Number values and an amendment number less than the number of the amendment to be applied.

The license units requirements determination method or LURDM element is shown in syntax diagram in FIG. 34. The combination-permitted field indicates whether conforming license managers are permitted to combine together into a common pool the units from different product use authorizations if those produce use authorizations have the same product record value; for example, if combination is permitted and a single license manager discovers in its database two 500-unit authorizations for the use of DEC Cobol, the license manager would be permitted to combined these two authorizations into a logical grant of 1000 units. The overdraft-limit modifies the behavior of a conforming license management facility in those cases where it is found that there are zero or fewer license units available for use at the time of a request for the allocation or consumption of additional license units. Operation of overdraft is different depending upon whether allocative, or consumptive style is being used. In using with allocative style, an allocation is granted even though the remaining units are zero or less, up to the overdraft-limit. In using with consumptive style, the license is authorized to accumulate a negative balance of license units, up to the overdraft-limit. Overdraft-logging-required indicates whether all license grants which are the result of overdraft use must cause a log record to be generated. When the allocation-size field is non-zero, then all unit allocations and delegations must be made in sizes which are whole number multiples of the allocations-size value. Lurdm-kind identifies the method by which license unit requirements will be calculated once the requirement for an allocation has been discovered, the permitted alternatives being (a) LURT which specifies that license unit requirements are to be determined by lookup in the LURT which is associated with the current license, (b) Constant which specifies that license unit requirements are constant for all platforms on which the licensed product or product feature may run, and (c) Private-LURDM which specifies that license unit requirements are to be determined by the licensed product, not by the license management facility. The named-lurt-id specifies the name of the LURT table to be used in determining license unit requirements if the LURDM-kind is specified as LURT; if the LURDM-kind is specified as LURT and no table is explicitly named, the name of the table to be used is constructed from the issuer name on the product use authorization. Lurdm-value specifies the LURT column to be used when LURDM-kind=LURT; however, when LURDM-kind=Constant, the Lurdm-value field contains the precise number of units to be allocated or consumed. Default-unit-requirement specifies the unit requirement value to be used when the appropriate LURT does not have a row corresponding to the appropriate platform ID; when specified on a product use authorization with Style=Allocative, the context template will change to Process+Product_Specific and the Duration will change to Transaction in cases of unrecognized Platform ID's.

The management constraints element is shown in a syntax diagram in FIG. 35. The management-context field specifies a list of zero or more partial context names which identify the specific contexts within which the license data may be managed. If no management contexts are specified, the license data may be managed within any context controlled by the licensee. The contexts used in specifying Management Context Constraints may only contain the Network, Domain, and Node subcontexts. Specifying a list of management contexts does not effect whether or not the license data can be used within other contexts. For example, unless otherwise restricted, license data with a specified management context can be remotely accessed from or delegated to other nodes in a network. The management-scope field defines the maximum permitted size of the license management domain within which the license data may be managed or distributed, these being single-platform, management-domain, or entire-network. Single-platform constrains the license management domain for the subject license data to be no larger than a single platform. Management-domain constrains the license management domain for the subject license data to be no larger than a single management-domain. Entire-network constrains the license management domain for the subject license data to be no larger than a single wide area network; that network which contains the platform on which the license units were initially loaded. Although technology may not exist to detect the interorganizational boundaries of a wide area network (i.e., what is on the Internet as opposed to being on a company's own network), the assumption is that interorganization and internetwork sharing of licenses will normally be considered a violation of license terms and conditions. The backup-permitted field indicates if the Issuer has authorized the use of backup delegations for this data. Delegation-permitted indicates if the Issuer has authorized the licensee to delegate this data. Maximum-delegation-period identifies the longest interval during which a delegation may be valid; by default, delegations have a life of 72-hours.

The major elements of the management policy specification are shown in FIG. 3, as previously discussed. A syntax diagram for the management policy element is shown in FIG. 36. For the Style field, three fundamental styles of license management policy are supported, allocative, consumptive, and private-style, as explained above. Only one of these styles may be assigned to any single product use authorization. The Context-template specifies those components (sub-contexts) of the execution-context name which would be used in determining if unit allocations are required. The Duration defines the duration of an allocation of license units to a specific context or the duration of the period which defines a valid consumptive use. For duration of type "Assignment," the specification of a Reassignment Constraint is also provided for. Three types of Duration_Kind are supported, these being Transaction, Assignment and Immediate, as explained above. The lur-determination-method stores information used in calculating the number of units that should be allocated or consumed in response to a license request. The allocation-sharing-limit identifies the largest number of execution contexts that may share an allocation made under this management policy; and allocation-sharing-limit of 0 indicates that the number of execution contexts that may share an allocation is unlimited. The reassignment-constraint specifies a minimum duration of assignment; although there is normally no constraint placed on how frequently granted units may be reassigned, an issuer may constrain reassignment by specifying this minimum duration of an assignment, in which case reassignment of assigned units will not be supported until the amount of time specified in the Reassignment Constraint has passed. If an assignment of some particular set of units has been delegated and the delegation period for that delegation has not terminated, cancellation of the delegation must be performed prior to reassignment.

The member element identifies a specific licensed product which may be part of a calling authorization or group definition, and is shown in syntax diagram in FIG. 37. Member-product identifies the product which is a member. Member-signature is constructed from the product and token fields of the called member structure as well as the product and issuer fields of the calling product. Member-token provides the data which should be used as the product token for this member.

Named values are data elements with a character string tag that identifies the data element, and have a syntax as shown in FIG. 38, which also shows the syntax for ValueData and named value list. A named value list models a list of named values, with an example being shown in FIG. 39. In FIG. 38, Value-Name uniquely identifies the value; no standard value names are defined, and the period character can be used as a part of the value name to form a hierarchical tag registry at the discretion of the issuer. Value-data is the data that has been named; data types are selected from the possible Value Data types, seen in the Figure. Value-boolean means the named data is a boolean value. Value-integer means the named data is an integer value. Value-text means the named data is a StringList value. Value-general means the named data is a stream of bytes in any format. Value-list means the named data is a list of named data values.

The product ID explicitly identifies the product which is the subject of the license data with which it is associated, with the syntax for ProductID being shown in FIG. 40. The version and release date fields provide a mechanism for defining which specific instances of the licensed product are described in the associated license data. The Producer field is a registered name which identifies the producer of the licensed feature; in the case of Group Names, the Producer is always also the Issuer of the group. The Product-name identifies a licensed software feature. The First-version identifies the earliest version of the product whose use is authorized. The Last-version identifies the latest version of the product whose use is authorized. The First-release-date identifies the earliest release of the product whose use is authorized. The Last-release-date identifies the latest release of the product whose use is authorized. Conforming license managers are required to interpret the contents of these fields in the most restrictive way possible. Thus, if a license is issued with Last-version=3,.0 and a Last-release-Date of 1 Jan. 1991, then the use of version 2.0 of the licensed product would be unauthorized if it has a release date of 2 Jan. 1991. If either a First-version or First-release-date is specified without a matching Last-version or Last-release-date, use of the produce is authorized for all versions or release dates following that specified. Similarly, if either a last-version or Last-release-date is specified without a matching First-version or First-release-date, use of the produce is assumed to be authorized for all versions or release dates prior to that specified. Issuers should typically only specify one of either First-version or First-release-date. This is the case since it is anticipated that these fields will typically refer to events which occurred prior to the moment of license data issuance. Thus, it should normally be possible for the issuer to state unambiguously with only one of these two fields which is the oldest implementation of the product that is to be authorized. The architecture does permit, however, both fields to be used in a single product authorization.

The signature element is used to establish the integrity and authorship of the license data with which it is associated. A syntax diagram for the signature element is shown n FIG. 41. The Signature-algorithm field identifies the registered algorithm that was used to produce the digital signature. Signature-parameters are the values of the algorithm's parameters that are to be used; the need for and syntax of parameters is determined by each individual algorithm. Signature-value is an enciphered summary of the information to which the signature is appended; the summary is produced by means of a one-way hash function, while the enciphering is carried out using the secret key of the signer (Issuer).

The term element defines an interval during which the license data is valid, and is shown in syntax diagram form in FIG. 42. The fields are start-date and end-date. Start-date identifies the first date of the term; if not specified, the license data is considered valid on any date prior to the end-date. End-date identifies the last date of the term; if not specified, the license data is considered valid on any date after the Start-date. While the Start-date is always either omitted or specified as an absolute date, the End-date can be either absolute or relative. If the End-date is specified as a relative or "interval" date and the Start-date has been omitted, the date of license registration will be used as the effective start date in computing the valid term of the license data. It should be noted that the system does not specify the mechanism by which system dates are maintained by platforms supporting system components. Instead, the system always accepts that system time returned to it as correct. Thus, the reliability of the management of license data which specifies terms is dependent on the time management function of the underlying platform.

The version element identifies a four-part version of the licensed software product or feature. A syntax diagram of the version element is shown in FIG. 43. The schematics of each of the four parts is not detailed, but it is required that producers who wish to permit version ranges to be specified on product use authorizations ensure that the collating significance of the four parts is maintained. When comparing versions, Part-1 is considered first, then Part-2, then Part-3, and finally, Part-4. Part-1 identifies a major modification to the versioned object. Part-2 identifies a modification to the versioned object which is less significant than a modification which would cause a change in the Part-1 value. Part-3 identifies a modification to the versioned object which is less significant than a modification which would cause a change in the Part-2 value. Part-4 identifies a modification to the versioned object which is less significant than a modification which would cause a change in the Part-3 value.

FILTERS

An important feature is the use of filters in the license management program 11, includjng the client interface 31 and the management interface 33. A filter is used is select items in the license database 23, for example.

Various selection mechanisms are used in picking out or doing lookups in database technology; filters are one of them. The filter engine used in the license management system 11 of FIG. 1 is generally of a known construction, with the exception of the select filter item type as will be described, which allows a complex rather than a flat data format to be selected from. The feature that is of importance to this embodiment is the way of specifying times as an input to the filter function, rather than the filter function itself. Thus, there is described below a template for specifying input to the filter engine. This is as if a form were used as the input, with blanks on the form; by filing in certain blanks these would be the items selected on, the blanks not filled in would be "don't care".

An instance of the class filter is a basis for selecting or rejecting an object on the basis of information in that object. At any point in time, a filter has a value relative to every object—this value is false, true or undefined. The object is selected if and only if the filter's value is true. This concrete class has the attributes of its superclass—Object—and the specific attributes listed in the table of FIG. 44.

A filter is a collection of simpler filters and elementary filter-items together with a Boolean operation. The filter value is undefined if and only if all the component filters and filter-items are undefined. Otherwise, the filter has a Boolean value with respect to any object, which can be determined by evaluating each of the nested components and combining their values using Boolean operation (components whose value is undefined or ignored). The attributes specific to filter as shown in FIG. 44 are (a) filter items which are a collection of assertions, each relating to just one attribute of an object (b) filters which are a collection of simple filters, and (c) filter type which is the filter's type, of one of the following values: And, Or, Not.

An instance of the class filter item is a component of a filter. It is an assertion about the existence or values of a single attribute of a license data object or one or its subobjects. This concrete class has the attributes of its superclass—object—and the specific attributes listed in the table of FIG. 45.

The value of a filter item is undefined if: (a) the Attribute Types are unknown, or (b) the syntax of the Match Value does not conform to the attribute syntax defined for the attribute type, or (c) a required Attribute is not provided. The attributes specific to filter item as shown in FIG. 45 are (a) filter item type which identifies the type of filter item and thereby the nature of the filter, and its value must be one of

| | |
|---|---|
| equality | less |
| inequality | present |
| greater or equal | select |
| less or equal | request candidates |
| greater | simulate request |

(b) attribute type which identifies the type of that attribute whose value or presence is to be tested; the value of All Attributes may be specified, (c) match value which is the value which is to be matched against the value of the attribute, (d) filter which identifies the filter to be used in evaluating a selected subobject of the current object; the filter is ignored if the filter item type is not select or if the specified attribute type is not present in the object, and upon evaluation of the filter the value of filter item will be set to that of the filter, (e) initial substring, if present, this is the substring to compare against the initial portion of the value of the specified attribute type, (f) substring, if present, this is the substring(s) to compare against all substrings of the value of the specified attribute type, (g) final substring, if present, this is the substring to compare against the final portion of the value of the specified attribute type, and (h) license request, if present, this is license request against which the appropriate license data objects should be evaluated; this attribute may only be specified if the value of the filter item type is either Request Candidates or Simulate Request.

An instance of enumeration syntax Filter Type identifies the type of a filter. Its value is chosen from one of the following: (a) And means the filter is the logical conjunction of its components; the filter is true unless any of the nested filters or filter items is false, or if there are no nested components, the filter is true; (b) Or means the filter is the logical disjunction of its components; the filter is false unless any of the nested filters or filter items is true, or, if there are no nested components, the filter is false; (c) Not means the result of the filter is reversed; there must be exactly one nested filter or filter item, and the filter is true if the enclosed filter or filter item is false, and is false if the enclosed filter or filter item is true.

An instance of enumeration syntax Filter Item Type identifies the type of a filter item. Its value is chosen from on of the following: (a) Equality which means the filter item is true if the object contains at least one attribute of the specified type whose value is equal to that specified by Match Value (according to the equality matching rule in force), and false otherwise; (b) Inequality which means the filter item is true if the object contains at least one attribute o the specified type whose value is not equal to that specified by Match Value (according to the equality matching rule in force), and false otherwise; (c) Greater or Equal which means the filter item is true if the object contains at least one attribute of the specified type whose value is equal to or greater than the value specified by Match Value (according to the matching rule in force), and false otherwise; (d) Less or Equal which means the filter item is true if the object contains at least one attribute of the specified type whose value is equal or less than the value specified by Match Value (according to the matching rule in force), and false otherwise; (e) Greater which means the filter item is true if the object contains at least one attribute of the specified type whose value is greater than the value specified by Match Value (according to the matching rule in force), and false otherwise; (f) Less which means the filter is true if the object contains at least one attribute of the specified type, whose value is less than the value specified by Match Value (according to the matching rule in force), and false otherwise; (g) Present which means the filter item is true if the object contains at least one attribute of the specified type, and false otherwise; (h) Select which means the filter items is true if the object contains at lease one attribute of the specified type which has an object syntax and when the Filter is evaluated against the attributes of that object the Filter is true, and false otherwise; (i) Request Candidates which means the filter item is true, if the object against which it is evaluated is one which could be used to provide some or all of the units requested by the specified License Request; the evaluation is made independently of any outstanding allocations or preallocations; and (j) Simulate Request which means the filter item is true if the object against which it is evaluated is one which would be used to provide some or all of the units requested by the specified License Request.

The Request Candidates and Simulate Request filter item types are of special use in testing and prototyping of systems by a license manager at a licensee's site. For example, the license manager can simulate the effect of potential assignments, the effect of a population of certain types on a network, etc.

As an example, FIG. 46 shows how a filter may be constructed to identify "All Product Use Authorizations issued by Digital for the Product 'Amazing Graphics System' which contains a calling authorization for Digital's 'Amazing Database' Product". This example is in the international standard format referred to as X.409 as mentioned above.

Filters can also used in a request allocation, being specified in a request extension as explained above. That is, a filter is one of the optional items in a request extension. For example, if a user wanted to use a version of WordPerfect with French language extension, and there were version with and without on the network, his request allocation would have a request extension that specified a filter for "French" in the token field. In this manner, a product can describe itself more richly. The filter in the request extension can be a Required filter or a Preferred filter, meaning the feature such as "French" is either absolutely necessary, or merely the preferred.

While this invention has been described with reference to specific embodiments, this description is not meant to be construed in a limiting sense. Various modifications of the disclosed embodiments, as well s other embodiments of the invention, will be apparent to persons skilled in the art upon reference to this description. It is therefore contemplated that the appended claims will cover any such modifications or embodiments as fall within the true scope of the invention.

What is claimed is:

1. A method of managing use of licensed software items, said software items separately executable on a computer system or accessible by said computer system, the computer system including a processor and one or more nodes, comprising the steps of:

maintaining by said processor a store of license authorizations for said software items; each license authorization including an indication of license management policy for a software item, said indication having a plurality of sets of policy components, said sets of policy components granting specified restrictive rights to execute or access said software items by said nodes; said specified restrictive rights including sets of restrictions in at least context of use and duration of use of a software item; said policy components of each set providing alternatives in rights to execute or access said software items by one or more nodes in said computer system; said license authorizations being received by said processor, for storing in said store, from a license grantor external to said processor;

accessing said store by said processor using management functions executed on said processor to identify a license authorization in said store, and to modify in said store one or more of said specified restrictive rights of said policy components of the identified license authorization.

2. A method according to claim 1 wherein said step of accessing said store to modify one or more of said policy components is to allow grant of rights to use which are more restrictive than said specified restrictive rights.

3. A method according to claim 1 including the steps of:

sending from one of said nodes to said processor a request by a user of one of said software items to obtain permission to use said software item; said request identifying the user and said software item;

accessing sad store by said processor to obtain information from said license authorization for said software item, in response to said request, and comparing said identification of said user and said software item with said information, to produce a grant or refusal of said request for sending by said processor to said user.

4. A method according to claim 3 wherein said store is maintained by a license server, and said request is sent to said server.

5. A method according to claim 3 wherein said request is in the form of a remote procedure call, and sad grant or refusal sent to said user is a return of said procedure call.

6. A method according to claim 4 wherein said license authorization is a data arrangement specified as a product use authorization, and said product use authorization is received by said server from an issuer.

7. A method according to claim 4 wherein said server and said users are nodes on a computer network.

8. A method according to claim 1 wherein said policy components include a termination date, and said management functions can modify said termination date to an earlier termination date.

9. A method according to claim 1 wherein said policy components include a right of delegation of a right to grant said requests to another server, and said management functions can modify said right of delegation to remove said right of delegation.

10. A method according to claim 1 including storing in association with said license authorization a number of management attributes, and said management functions being able to modify said management attributes.

11. A method according to claim 10 wherein said management attributes include a reservation of units of license use granted by said license authorization so that said units will not be granted to a user in response to said request.

12. A method according to claim 10 wherein said management attributes include an allocation of units of license use to a specific context.

13. A method according to claim 12 wherein said management attributes include an allocation period which is the minimum duration of an allocation of units.

14. A method according to claim 10 wherein said management attributes include permission to enable a backup delegation of the right to grant said requests.

15. A method according to claim 1 wherein said specified restrictive rights include a set of restrictions in context of use of a software item, said set including identification of network, user name, process, operating system, and platform.

16. A system executable on a computer for managing use of a plurality of licensed software products, said software products operable separately from said system, said system comprising:

means executing on said computer for maintaining and accessing a store of license documents, one document for each said product; each license document in said store including an indication of license policy, sad indication having plurality of sets of policy components, sand policy components granting specified restrictive rights to use said software products; said specified restrictive rights including at least restrictions in context of use and duration of use of a software product; each said set of said policy components providing different alternative for said restrictive rights;

a management interface executable on said computer for accessing said store to modify selected ones of said policy components of an identified license document.

17. A system according to claim 16 including:

means executable on a processor for sending a request from a user of one of said products to obtain permission to use said product; said request identifying the user and said product;

means executable on said computer for accessing said store to obtain information from said license document for said product, in response to said request, and for comparing said identification of said user and said product with said information, and with constraints imposed by said policy components, to produce a grant or refusal of said request and send said grant or refusal to said user.

18. A system according to claim 16 wherein said management interface can modify said selected ones of said components to allow grant of rights to use which are more restrictive than said specified restrictive rights.

19. A system according to claim 17 wherein said means for maintaining, and said means for accessing and sending to said user are all located at a server on a distributed network, and said means for sending a request is located at a user node on said network.

20. A system according to claim 17 wherein said request is in the form of a remote procedure call, and said grant or refusal sent to said user is a return of said procedure call.

21. A system according to claim 19 wherein said license document is a data arrangement specified as a product use authorization, and said product use authorization is received by said server from a license issuer.

22. A system according to claim 16 wherein said policy components include a termination date, and sad management functions can modify said termination date to an earlier termination date.

23. A system according to claim 16 wherein said policy components include a right of delegation of a right to grant said requests to another server, and said management functions can modify said right of delegation to remove said right of delegation.

24. A system according to claim 16 including means for storing in association with said license authorization a number of management attributes, and said management functions being able to modify said management attributes.

25. A system according to claim 24 wherein said management attributes include a reservation of units of license use granted by sad license authorization so that said units will not be granted to a user in response to said request.

26. A system according to claim 24 wherein said management attributes include an allocation of units of license use to a specific context.

27. A system according to claim 26 wherein said management attributes include an allocation period which is the minimum duration of an allocation of units.

28. A system according to claim 24 wherein said management attributes include permission to enable a backup delegation of the right to grant said requests.

29. A method according to claim 15 wherein said specified restrictive rights include a set of restrictions in style of use of a software item, said set including allocative and consumptive use.

30. A system according to claim 16 wherein said specified restrictive rights include a set of restrictions in context of use of a software item, said set including identification of network, user name, process, operating system, and platform.

31. A system according to claim 30 wherein said specified restrictive rights include a set of restrictions in style of use of a software item, said set including allocative and consumptive use.

* * * * *

UNITED STATES PATENT AND TRADEMARK OFFICE
CERTIFICATE OF CORRECTION

PATENT NO. : 5,204,897

DATED : April 20, 1993

INVENTOR(S) : Robert M. Wyman

It is certified that error appears in the above-indentified patent and that said Letters Patent is hereby corrected as shown below:

Column 1, line 18, change "723,4571" to --723,457--.
Column 2, line 51, change "of" (second occurrence) to --or--.
Column 3, line 35, change "non-main" to --non-mail--.
Column 4, line 44, change "an" to --any--.
Column 6, line 31, change "receive" to --received--.
Column 7, line 31, before "(10" to --(1)--.
Column 9, line 32, change "division" to --divisions--.
Column 9, line 49, change "man" to --many--.
Column 10, line 55, change "line" to --link--.
Column 12, line 60, change "In" to --If--.
Column 13, line 68, change "product" to --products--.
Column 14, line 30, change "missing line encoding methods" to --encoding methods not known to customers, so it cannot be duplicated unless the--.
Column 14, line 44, change "kay" to --key--.
Column 14, line 59, change "with" to --within--.
Column 15, line 23, change "verifications" to --verification--.
Column 16, line 9, change "is" to --its--.
Column 16, line 28, change "form" to --from--.
Column 16, line 56, change "unit" to --units--.
Column 16, line 65, after "previously" insert --assigned to a specific context. The sub-contexts which must be specified in the--.
Column 16, line 66, change "contest" to --context--.
Column 17, line 2, change "of ten" to --often--.
Column 17, line 3, change "that" to --than--.
Column 17, line 24, change "of r" to --for--.
Column 17, lines 41-42, change "requirement" to --requirements--.
Column 18, line 9, change "form" to --from--.
Column 18, line 49, change "tow" to --two--.
Column 18, line 53, change "customer" to --custom--.

UNITED STATES PATENT AND TRADEMARK OFFICE
CERTIFICATE OF CORRECTION

PATENT NO. : 5,204,897
DATED : April 20, 1993
INVENTOR(S) : Robert M. Wyman

It is certified that error appears in the above-indentified patent and that said Letters Patent is hereby corrected as shown below:

Column 18, line 68, change "100units" to -- 100-units--.
Column 19, line 32, change "us" to --use--.
Column 19, line 64, change "licenses" to --licensed--.
Column 19, line 67, change "build" to --built--.
Column 20, line 44, change "prices" to --priced--.
Column 20, line 62, change "1,-unit" to --1-unit--.
Column 21, line 44, change "Im$_{13}$request$_{13}$" to --Im_request_--.

Column 22, line 46, change "by" (first occurrence) to --be--.
Column 22, line 46, change "rad" to --read--.
Column 22, lines 55-56, change "authoriztion" to --authorization--.
Column 22, line 57, change "us" to --use--.
Column 23, line 20, change "make" to --made--.
Column 23, lines 21-24, delete "When execution of the program 17, or before or after, a query allocation call can be made block 57, though this is optional and in most cases not needed."
Column 23, line 43, change "not" to --no--.
Column 24, line 34, change "manger" to --manager--.
Column 24, line 45, change "manger" to --manager--.
Column 25, line 10, change "manger" to --manager--.
Column 25, line 18, change "doe" to --done--.
Column 26, line 32, change "manger" to --manager--.
Column 28, line 19, change "al" to --all--.
Column 28, line 61, change "indication" to --indicating--.
Column 29, line 21, change "al" to --all--.
Column 29, line 58, change "if" (second occurrence) to --is--.
Column 30, line 8, change "confirms" to --conforms--.
Column 30, line 53, after "(" insert --::--.
Column 31, line 30, change "means" to --mean--.
Column 31, line 43, change "identity" to --identify--.
Column 32, line 28, change "date" to --data--.
Column 32, line 51, change "date" (both occurrences) to --data--.

UNITED STATES PATENT AND TRADEMARK OFFICE
CERTIFICATE OF CORRECTION

PATENT NO. : 5,204,897

DATED : April 20, 1993

INVENTOR(S) : Robert M. Wyman

It is certified that error appears in the above-indentified patent and that said Letters Patent is hereby corrected as shown below:

Column 32, line 54, change "licenses" to --licensee--.
Column 32, line 55, change "that" to --the--.
Column 33, line 20, change "addition" to --additional--.
Column 34, line 33, change "mangers" to --managers--.
Column 35, line 36, change "names" to --named--.
Column 35, line 54, change "manager" to --manage--.
Column 35, line 65, change "he" to --the--.
Column 36, line 5, change "he" to --the--.
Column 36, line 65, change "he" to --the--.
Column 37, line 8, change "he" to --the--.
Column 38, line 57, before "=UTCTime" insert --::--.
Column 40, line 51, change "would" to --should--.
Column 41, line 57, change "3,.0" to --3.0--.
Column 41, line 60, change "has" to --had--.
Column 42, line 13, change "n" to --in--.
Column 43, line 9, change "times" to --items--.
Column 44, line 29, change "on" to --one--.
Column 44, line 35, change "o" to --of--.
Column 44, line 60, change "items" to --item--.
Column 45, line 35, change "s" to --as--.
Column 47, line 6, change "sand" to --said--.
Column 47, line 11, change "alternative" to --alternatives--.
Column 48, line 4, change "sad" to --said--.
Column 48, line 19, change "sad" to --said--.

UNITED STATES PATENT AND TRADEMARK OFFICE
CERTIFICATE OF CORRECTION

PATENT NO. : 5,204,897                                 Page 4 of 4
DATED : April 20, 1993
INVENTOR(S) : Robert M. Wyman It is certified that error appears in the above-indentified patent and that said Letters Patent is hereby corrected as shown below:

Column 47, line 5, change "sad" to --said--.

Signed and Sealed this

Nineteenth Day of April, 1994

Attest:

BRUCE LEHMAN

Attesting Officer        Commissioner of Patents and Trademarks